United States Patent
Greene

(10) Patent No.: US 8,789,293 B2
(45) Date of Patent: Jul. 29, 2014

(54) DIFFERENTIAL-STIFFNESS IMPACT-ATTENUATION MEMBERS AND PRODUCTS INCLUDING THEM

(71) Applicant: NIKE, Inc., Beaverton, OR (US)

(72) Inventor: Pamela S. Greene, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/012,229

(22) Filed: Aug. 28, 2013

(65) Prior Publication Data

US 2014/0033566 A1    Feb. 6, 2014

Related U.S. Application Data

(63) Continuation of application No. 13/176,980, filed on Jul. 6, 2011, now Pat. No. 8,539,696, which is a continuation of application No. 11/942,008, filed on Nov. 19, 2007, now abandoned.

(51) Int. Cl.
| | |
|---|---|
| *A43B 13/18* | (2006.01) |
| *F16F 1/373* | (2006.01) |
| *A43B 13/20* | (2006.01) |
| *A43B 7/32* | (2006.01) |

(52) U.S. Cl.
CPC .............. *A43B 7/32* (2013.01); *A43B 13/181* (2013.01); *A43B 13/186* (2013.01); *F16F 1/373* (2013.01); *A43B 13/206* (2013.01)
USPC .......................................................... 36/27

(58) Field of Classification Search
CPC ........ A43B 7/32; A43B 13/18; A43B 13/181; A43B 13/184; A43B 13/185; A43B 13/186
USPC .................................................... 36/27, 28
See application file for complete search history.

(56) References Cited

U.S. PATENT DOCUMENTS

| | | | | |
|---|---|---|---|---|
| 4,521,979 A | * | 6/1985 | Blaser .............................. | 36/29 |
| 4,535,553 A | * | 8/1985 | Derderian et al. ................ | 36/28 |

(Continued)

FOREIGN PATENT DOCUMENTS

| | | |
|---|---|---|
| EP | 1386553 A1 | 2/2004 |
| EP | 1815764 A1 | 8/2007 |

(Continued)

OTHER PUBLICATIONS

International Search Report and Written Opinion, issued Jun. 15, 2009, in corresponding International Patent Application No. PCT/US2008/083852.

(Continued)

*Primary Examiner* — Marie Bays
(74) *Attorney, Agent, or Firm* — Banner & Witcoff, Ltd.

(57) ABSTRACT

A differential-stiffness impact-attenuation member includes at least one spring element. The spring element has dimensions in height, length and width directions. The height dimension extends from a top surface to a bottom surface. The length dimension extends from a front end to a back end. At least one of the top and bottom surfaces is adapted for mounting. The impact-attenuation member has a first stiffness characteristic in the height direction at the front end of the spring element and a second stiffness characteristic in the height direction at the back end of the spring element. The spring element may define a cavity. A tension element may engage the spring element and be located at least partially within the cavity. The impact-attenuation member may engage at least one of a foot-covering member, a foot-supporting member and a surface-contacting member associated with a foot-receiving device.

4 Claims, 24 Drawing Sheets

(56) References Cited

U.S. PATENT DOCUMENTS

| | | | |
|---|---|---|---|
| 4,864,738 A * | 9/1989 | Horovitz | 36/29 |
| 4,910,884 A | 3/1990 | Lindh et al. | |
| 5,337,492 A | 8/1994 | Anderie et al. | |
| 6,374,514 B1 * | 4/2002 | Swigart | 36/35 B |
| 6,851,204 B2 | 2/2005 | Aveni et al. | |
| 7,013,582 B2 | 3/2006 | Lucas et al. | |
| 7,314,125 B2 | 1/2008 | Smaldone et al. | |
| 7,401,419 B2 | 7/2008 | Lucas et al. | |
| 7,565,754 B1 * | 7/2009 | Acheson et al. | 36/28 |
| 7,644,518 B2 | 1/2010 | Chandler et al. | |
| 7,685,742 B2 | 3/2010 | Aveni et al. | |
| 7,730,635 B2 | 6/2010 | Aveni et al. | |
| 7,757,410 B2 | 7/2010 | Aveni et al. | |
| 7,757,411 B2 * | 7/2010 | Nakano | 36/37 |
| 7,779,558 B2 | 8/2010 | Nishiwaki et al. | |
| 7,798,298 B2 | 9/2010 | Smaldone et al. | |
| 7,877,898 B2 | 2/2011 | Aveni et al. | |
| 8,118,289 B2 | 2/2012 | Aveni et al. | |
| 2002/0038522 A1 * | 4/2002 | Houser et al. | 36/28 |
| 2003/0208929 A1 * | 11/2003 | Lucas et al. | 36/28 |
| 2006/0064900 A1 | 3/2006 | Aveni | |
| 2006/0065499 A1 | 3/2006 | Smaldone et al. | |
| 2007/0033830 A1 | 2/2007 | Chang | |
| 2007/0119074 A1 | 5/2007 | Aveni et al. | |
| 2007/0193065 A1 | 8/2007 | Nishiwaki et al. | |
| 2008/0016718 A1 | 1/2008 | Aveni et al. | |
| 2008/0016719 A1 | 1/2008 | Aveni et al. | |
| 2008/0016720 A1 | 1/2008 | Aveni et al. | |
| 2008/0263894 A1 * | 10/2008 | Nakano | 36/28 |
| 2011/0005100 A1 | 1/2011 | Smaldone et al. | |
| 2011/0138651 A1 | 6/2011 | Nishiwaki et al. | |

FOREIGN PATENT DOCUMENTS

| | | |
|---|---|---|
| EP | 1857003 A2 | 11/2007 |
| WO | 2008010974 A1 | 1/2008 |

OTHER PUBLICATIONS

International Preliminary report on Patentability, issued Jun. 3, 2010, in corresponding International Patent Application No. PCT/US2008/083852.

Office Action, issued Mar. 10, 2011, in corresponding Chinese Patent Application No. 200880116612.X.

Extended European Search Report, issued Jan. 8, 2013, in corresponding European Patent Application No. 12192440.1.

* cited by examiner

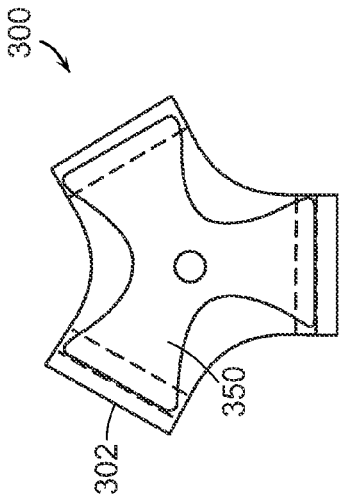
FIG. 19D
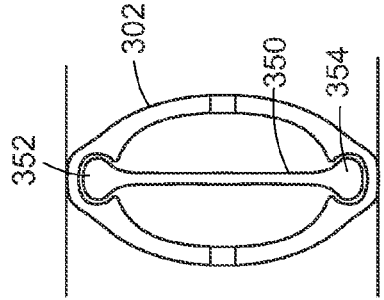
FIG. 19E
FIG. 19C
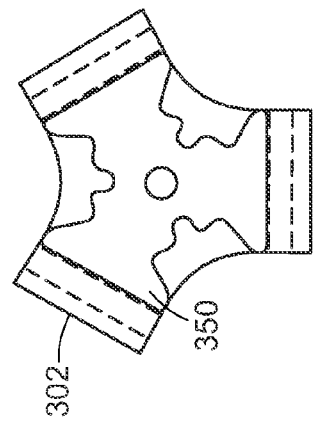
FIG. 19A
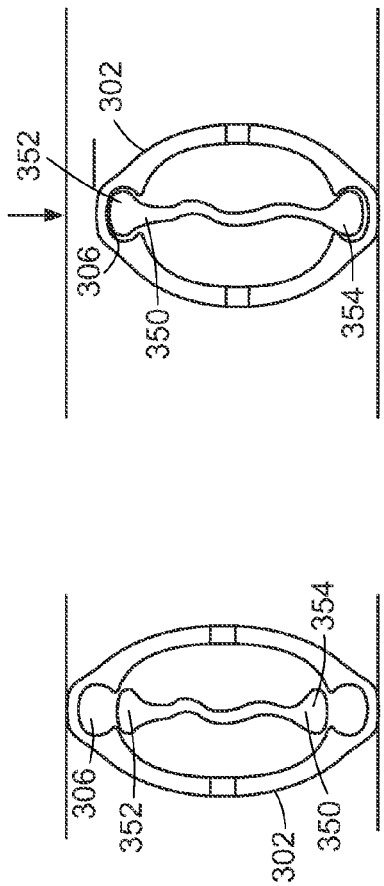
FIG. 19B

DIFFERENTIAL-STIFFNESS IMPACT-ATTENUATION MEMBERS AND PRODUCTS INCLUDING THEM

RELATED APPLICATIONS

This application is a continuation of U.S. patent application Ser. No. 13/176,980, filed Jul. 6, 2011, which is a continuation of U.S. patent application Ser. No. 11/942,008, filed Nov. 19, 2007, each of which is incorporated herein by reference in its entirety.

FIELD OF THE INVENTION

This invention relates generally to impact-attenuation members and, in particular, to differential-stiffness impact-attenuation members included, e.g., in articles of footwear and other foot-receiving device products.

BACKGROUND

Conventional articles of athletic footwear have included two primary elements, namely an upper member and a sole structure. The upper member provides a covering for the foot that securely receives and positions the foot with respect to the sole structure. In addition, the upper member may have a configuration that protects the foot and provides ventilation, thereby cooling the foot and removing perspiration. The sole structure generally is secured to a lower portion of the upper member and generally is positioned between the foot and the ground. In addition to attenuating ground or other contact surface reaction forces, the sole structure may provide traction and control foot motions, such as pronation. Accordingly, the upper member and sole structure operate cooperatively to provide a comfortable structure that is suited for a variety of ambulatory activities, such as walking and running.

The sole structure of athletic footwear generally exhibits a layered configuration that includes a comfort-enhancing insole, a resilient midsole, and a ground-contacting outsole that provides both abrasion-resistance and traction. The midsole is typically the primary sole structure element that attenuates ground reaction forces and controls foot motions. Conventionally, the midsole was formed from an open- or closed-cell polymer foam material, such as ethylvinylacetate or polyurethane, that resiliently compresses under an applied load to attenuate ground reaction forces.

Impact-attenuating elements for footwear have been developed for various specific applications. For example, for athletic footwear, which may be subjected to relatively high impact forces, e.g., from running, jumping, twisting, changing directions, and the like, it may be desirable to provide increased impact-attenuation capabilities and/or increased spring-back or recovery capabilities. Thus, in addition to polymer foam materials, midsoles may also include, for example, one or more fluid-filled bladders and moderators. Other examples of such impact-attenuating elements have been described in U.S. Patent Application Publication No. 2006/0065499, titled "Impact Attenuating and Spring Elements and Products Containing Such Elements," filed Sep. 27, 2004; U.S. Patent Application Publication No. 2006/0064900, titled "Impact Attenuating Devices and Products Containing Such Devices," filed Sep. 27, 2004; and U.S. Patent Application Publication No. 2007/0119074 titled "Impact-Attenuation Members and Products Containing Such Members," filed Jun. 5, 2006, each of which application is incorporated herein by reference in its entirety.

These known impact-attenuating elements are symmetric from front-to-back and side-to-side, and thus, they provide symmetric impact-attenuation capabilities from one end to the other and from one side to the other. In other words, the stiffness and deflection characteristics of any of these known individual impact-attenuating elements are the same at opposite ends or opposite sides. Due to their symmetric nature, when subjected to an external, centrally-applied impact load or an evenly distributed load, they deflect or react evenly to the loading.

Ideally, the stiffnesses of different portions of an article of footwear will be tailored to the footwear application. For example, a certain midsole stiffness may be desired in the heel zone for heel strike during running, while another midsole stiffness may be more appropriate for walking impacts. Thus, a stiffer impact-attenuating element may be ideal for medial heel posting, while a softer stiffness may be desired for the lateral heel area. Generally, the perimeter sidewall impact-attenuation and stability desired in a midsole is different from the interior impact-attenuation requirements.

It would be desirable to provide an impact-attenuation member that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

Aspects of this invention relate to impact-attenuation members and products in which they are used (such as footwear, other foot-receiving devices, and the like). In at least some examples, impact-attenuation members in accordance with at least some example aspects of this invention may include: a spring element having dimensions in height, length and width directions, the height dimension extending from a top to a bottom, and having at least one of the top and the bottom adapted for mounting, the length dimension extending from a front end to a back end; and wherein the spring element has a first spring element stiffness characteristic in the height direction at the front end and a second spring element stiffness characteristic in the height direction at the back end.

According to another aspect of the present invention, an impact-attenuation member includes: a spring element characterized by dimensions in height, length and width directions, the height dimension extending from a top surface to a bottom surface, and at least one of the top surface and the bottom surface adapted for mounting, wherein at most one of two mutually perpendicular planes, each extending in the height direction, defines a plane of symmetry of the spring element. In one embodiment, one of two mutually perpendicular planes, each extending in the height direction, defines a plane of symmetry of the spring element.

According to an aspect of the present invention, an impact-attenuation member includes a spring element having a truncated substantially conical shape having a longitudinal axis extending in a length direction. A mounting surface is provided on a lateral surface of the substantially conical shape.

According to another aspect of the present invention, an impact-attenuation member includes a spring element having an axis extending from a top surface to a bottom surface, wherein at least one of the top and bottom surfaces is adapted for mounting, and having at least three non-contiguous lobes each extending radially outward from the axis and further each extending from the top to the bottom surfaces. The lobes may be substantially equally-rotationally-spaced around the axis.

The spring element may define a cavity. Further, a tension element may be located at least partially within the cavity and may engage the spring element, the tension element extending across the cavity in the width direction. The tension element may be substantially planar. Further, the tension element may engage one or more receptacles in the spring element.

In accordance with another aspect, a foot-receiving device includes: at least one of a foot-covering member, a foot-supporting member and a surface-contacting member; and at least one impact-attenuation member engaged with the at least one of the foot-covering member, the foot-supporting member and the surface-contacting member, the impact-attenuation member comprising at least one spring element as described herein. The spring element, for example, the top surface of the spring element, may be engaged with at least one of a foot-covering member, a foot-supporting member and a surface-contacting member in a heel area and/or in a forefoot area.

According to a further aspect of the present invention, a method of using an impact-attenuation member is provided. The impact-attenuation member is characterized by mutually perpendicular height, length and width dimensions, the length dimension extending from a front end to a back end, the impact-attenuation member having a spring element and a tension element extending, at least partially across the width dimension of the impact-attenuation member, between a first engagement portion engaging the spring element and a second engagement portion engaging the spring element. The method includes: decreasing the height dimension of the impact-attenuation member at the front end as a function of a first spring constant; decreasing the height dimension of the impact-attenuation member at the back end as a function of a second spring constant, wherein the second spring constant differs from the first spring constant; and increasing a distance between the first and second engagement portions, thereby stretching the tension element. In one example structure, the tension element engages a receptacle in the spring element, and the method further includes: closing the receptacle around the tension element.

These and additional features and advantages disclosed here will be further understood from the following detailed disclosure of certain embodiments.

BRIEF DESCRIPTION OF THE DRAWINGS

A more complete understanding of the present invention and certain advantages thereof may be acquired by referring to the following description in consideration with the accompanying drawings, in which like reference numbers indicate like features.

FIGS. 19A-E illustrate a method for engaging a tension element with a spring element in accordance with the invention.

FIGS. 23 and 24 illustrate a foot-receiving device in accordance with this invention, wherein FIG. 23 shows the impact-attenuation members in an undeformed state and FIG. 24 shows the impact-attenuation members in a deformed (compressed) state.

Figure 1A:
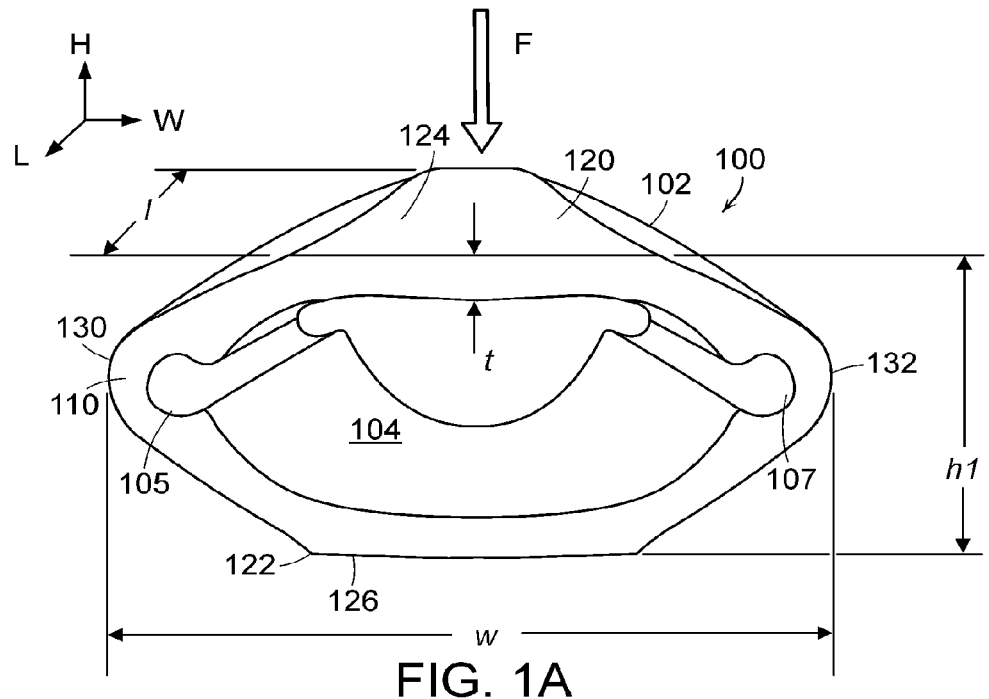
FIG. 1A illustrates a perspective front view of a first example impact-attenuation member in accordance with this invention.

The figures referred to above are not drawn necessarily to scale and should be understood to provide a representation of the invention, illustrative of the principles involved. Some features of the foot-receiving devices depicted in the drawings may have been enlarged or distorted relative to others to facilitate explanation and understanding. Foot-receiving devices as disclosed herein would have configurations and components determined, in part, by the intended application and environment in which they are used.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "side," "front," "rear," "upper," "lower," "vertical," "horizontal," and the like may be used in this specification to describe various example features and elements of the invention, these terms are used herein as a matter of convenience, e.g., based on the example orientations shown in the figures, orientations at rest, and/or orientations during typical use. Nothing in this specification should be construed as requiring a specific three-dimensional orientation of structures in order to fall within the scope of this invention.

To assist the reader, this specification is broken into various subsections, as follows: Terms; General Description of Differential-Stiffness Impact-Attenuation Members and Products Containing Them; Specific Examples of the Invention; and Conclusion.

A. Terms

The following terms are used in this specification, and unless otherwise noted or clear from the context, these terms have the meanings provided below.

"Foot-receiving device" means any device into which a user places at least some portion of his or her foot. In addition to all types of footwear (described below), foot-receiving devices include, but are not limited to: bindings and other devices for securing feet in snow skis, cross country skis, water skis, snowboards, and the like; bindings, clips, or other devices for securing feet in pedals for use with bicycles, exercise equipment, and the like; bindings, clips, or other devices for receiving feet during play of video games or other games; and the like.

"Footwear" means any type of wearing apparel for the feet, and this term includes, but is not limited to: all types of shoes, boots, sneakers, sandals, thongs, flip-flops, mules, scuffs, slippers, sport-specific shoes (such as golf shoes, basketball shoes, tennis shoes, baseball cleats, soccer or football cleats, ski boots, etc.), and the like.

"Foot-covering members" include one or more portions of a foot-receiving device that extend at least partially over and/or at least partially cover at least some portion of the wearer's foot, e.g., so as to assist in holding the foot-receiving device on and/or in place with respect to the wearer's foot. "Foot-covering members" include, but are not limited to, upper members of the type provided in some conventional footwear products.

"Foot-supporting members" include one or more portions of a foot-receiving device that extend at least partially beneath at least some portion of the wearer's foot, e.g., so as to assist in supporting the foot and/or attenuating the reaction forces to which the wearer's foot would be exposed, for example, when stepping down in the foot-receiving device. "Foot-supporting members" include, but are not limited to, sole members of the type provided in some conventional footwear products. Such sole members may include conventional outsole, midsole, and/or insole members.

"Surface-contacting members" include at least some portions of a foot-receiving device structure that contact the ground or any other surface in use, and/or at least some portions of a foot-receiving device structure that engage another element or structure in use. Such "surface-contacting members" may include, for example, but are not limited to, outsole elements provided in some conventional footwear products. "Surface-contacting members" in at least some example structures may be made of suitable and conventional materials to provide long wear, traction, and protect the foot and/or to prevent the remainder of the foot-receiving device structure from wear effects, e.g., when contacting the ground or other surface in use.

B. General Description of Differential-Stiffness Impact-Attenuation Members and Products Containing them In general, aspects of this invention relate to impact-attenuation members and products in which they are used (such as footwear, other foot-receiving devices, heel cage elements, and the like), and methods of using them in such products. These and other aspects and features of the invention are described in more detail below.

1. Differential-Stiffness Impact-Attenuation Members

Impact-attenuation members in accordance with at least some example aspects of this invention include: a spring element defining a cavity, the spring element having dimensions in height, length and width directions, the height dimension extending from a top to a bottom, and having at least one of the top and the bottom adapted for mounting, the length dimension extending from a front end to a back end; and wherein the impact-attenuation member has a first stiffness characteristic in the height direction at the front end of the spring element and a second stiffness characteristic in the height direction at the back end of the spring element. In the context of this aspect of the invention, a stiffness characteristic is associated with a spring constant of the impact-attenuation member. The stiffness characteristic is a measure of how stiff the spring is. A spring that is very hard to extend (or compress) has a large spring constant. A spring that is easy to extend (or compress) has a small spring constant. The stiffness characteristic is related to the force developed in the member for any given deflection (i.e. compression or extension) of the member. Conversely, the stiffness characteristic is related to the deflection of the member for any given force applied to the member. The stiffness characteristic may also be related to the amount of energy stored in the impact-attenuation member when the member is subjected to an impact load, and the amount of energy released when the load is released from the member. A stiffness characteristic of the impact-attenuation member need not be a constant, but may vary with a deflection of the impact-attenuation member.

In such members, due to the different stiffness characteristics of the impact-attenuation member at the front and back ends of the spring element, when a force is applied in the height direction, the height dimension of the front end of the spring element may decrease more or less than the height dimension of the back end of the spring element. Additionally, due to the different stiffness characteristics of the impact-attenuation member at the front and back ends of the spring element, the spring element may exert a force at its front end, seeking to restore the impact-attenuation member back to its original configuration, which differs from a restoring force exerted at its back end.

Stiffness characteristics typically are functions of the physical dimensions of the elements and the material characteristics of the elements. Thus, a spring element formed of a single material but having different dimensions at the front end as compared with the back end, will have different stiffness characteristics at the front end than at the back end. Similarly, a spring element having the same dimensions at the front end as at the back end but having different materials at the front end as compared with the back end, may have different stiffness characteristics at the front end than at the back end. In both exemplary aspects, there is a first stiffness characteristic of the element at the front end and a second (and different) stiffness characteristic of the element at the back end.

Impact-attenuation members in accordance with at least some other example aspects of this invention include a spring element characterized by dimensions in height, length and width directions, the height dimension extending from a top surface to a bottom surface, and at least one of the top surface and the bottom surface adapted for mounting. In this exemplary aspect, at most one of two mutually perpendicular planes, each extending in the height direction, defines a plane of symmetry of the spring element. For example, a plane extending in the height and length directions is mutually perpendicular to a plane extending in the height and width directions. According to this aspect, at most one of these planes could define an plane of symmetry of the spring element. Thus, this exemplary aspect excludes impact-attenuation members wherein two mutually perpendicular planes, each extending in the height direction, define a plane of symmetry of the spring element.

In such members the non-symmetry of the spring element allows the impact-attenuation member to react to symmetrically applied loads in a non-symmetrical fashion. Thus, a centrally applied impact load or an evenly and centrally distributed load could cause the impact-attenuation member to deflect more at one end than at another end.

Impact-attenuation members in accordance with certain example aspects of this invention include a spring element defining a cavity, the spring element having height, length and width dimensions, the height dimension extending from a top surface to a bottom surface, and having at least one of the top surface and the bottom surface adapted for mounting; wherein the width dimension of the spring element varies linearly along at least a portion of the length of the spring element. In such members, when a force, for example, an impact load, is applied to the spring element so as to decrease the height dimension, the spring element may exert a non-constant force over its length that seeks to restore the impact-attenuation member back to its original configuration. Further, due to the variation in the width dimension of the spring element along at least a portion of the length of the spring element, the spring element may have a varying stiffness characteristic along its length, i.e. the stiffness of the spring element may vary along at least a portion of the length of the spring element. This may result in a varying change in the height dimension of the spring element, even upon the application of an evenly distributed force.

The impact-attenuation member may come in a wide variety of different physical structures without departing from the invention. For example, the spring element may have a substantially conical shape, including variations thereof. A substantially conical shape includes a true conical shape. A characteristic of the conical shape is that a width dimension at one end is greater than the width dimension at the other end. The cone may be narrow or wide, i.e. the angle of the sidewalls to one another (the interior two-dimensional angle of the conical apex) may range from acute to obtuse. Further, the spring element need not be a "true" truncated conical shape, but may be a substantially truncated conical shape, i.e. the spring element may deviate in one or more characteristics from a perfectly conical shape. For example, the cross-section of a substantially "conically-shaped" spring element may be more elliptical (or "squashed") than circular.

As another example, the substantially conically-shaped spring element may include flat portions or sides. Such flat portions may be in combination with curved portions. Thus, by way of non-limiting example, the substantially conical spring element may have multiple flat sides such that the substantially conical spring element is pyramidally shaped or quasi-pyramidally shaped. The pyramidally-shaped or quasi-pyramidally shaped spring element could have three, four, five or more sides. Further, the sides need not have identical shapes, curvatures, areas or interior angles. Further, the sides of the substantially conical spring element may include steps, such as right-angle steps in the manner of a Mayan pyramid, oblique steps, smoothed (i.e. rounded) steps, sloped steps, etc.

In one aspect of the invention, the spring element may have a truncated substantially conical shape. The truncation surfaces need not be planar, but may be convex or concave or a combination thereof.

Certain impact-attenuation members may embody even other physical structures without departing from the invention. Thus, for example, in another aspect of the invention, the spring element need not be symmetrical side-to-side. As a non-limiting example, one side of a spring element may be configured as half of a truncated substantially conical shape, while the other side may be configured as half of a cylindrical shape.

Certain other impact-attenuation members may embody even other physical structures without departing from the invention. In one aspect, the spring element may have a rotationally symmetric shape having different stiffness characteristics at least two opposite sides. A tri-lobed or tri-legged spring element is an example of such a spring element. According to this embodiment, the spring element could have any odd number of evenly or unevenly spaced legs. For example, the spring element may be a hollow sphere, or substantially spherical shape, having three orange-slice shaped wedge openings (or other shaped openings) cut into the hollow sphere thereby defining three legs therebetween.

The three openings and the three legs may be rotationally symmetric. Further a substantially spherical shape may include flattened, flying-saucer type shapes. A substantially spherical shape may also include a faceted spherical shape, including facets running longitudinally, facets running latitudinally, or both (much like a disco-ball). The substantially spherical shape may even further include steps at the intersections of the facets.

According to another embodiment, the spring element need not be rotationally symmetric. Thus, by way of non-limiting example, the spring element could have an even number of unevenly spaced lobes or legs. Alternatively, the spring element could have any number of evenly or unevenly space lobes or legs, wherein the stiffness characteristics and/or other defining features of the individual lobes or legs differ from one another. For example, the spring element could have a basic shape that is substantially elliptical in nature with cut-outs or openings forming multiple noncontiguous lobes or legs.

According to certain aspects of the invention, the spring element includes a cavity. The cavity may be completely enclosed or may be open at one or more openings. In one aspect, the spring element is essentially hollow. In another aspect, the cavity is configured as a throughbore having openings at opposite ends of the spring element. The cavity could be of any suitable shape. Further, it could be symmetrical or non-symmetrical and centrally or non-centrally located within the spring element. The wall thicknesses of the spring element around the cavity need not be constant, but, for example, could vary around the circumference and/or from front-to-back along the length.

At least one surface of the spring member may be adapted for engaging an external structure, such as a portion of a foot-receiving device. The foot-receiving device may be an article of footwear including at least one of a foot-covering member, a foot-supporting member, a surface-contacting member (e.g., an upper, a sole structure (such as a midsole), an outsole member, etc.). For example, the spring member may be provided with a surface that complements the surface of the external structure and is suitable for adhesive attachment. As another example, the spring member may optionally be adapted for engaging an external structure in a releasable or removable manner (e.g., so as to allow exchange of one impact-attenuation member or a portion thereof for another, to allow re-orientation of the impact-attenuation member or a portion thereof, etc.). As another example, the external structure may be a base plate, optionally forming a portion of the footwear structure, that serves as a base for holding or engaging multiple spring members.

The spring element of the impact-attenuation member may be made of any desired number of parts, pieces, or sections without departing from the invention. In some examples, the spring element may be formed as a unitary body. In another example, the spring element may be formed of two substantially symmetrical halves arranged to face one another to provide a cavity. As a further example, the spring element may be initially formed of two or more unsymmetrical body portions, which may be releasably or non-releasably joined together to form a one-piece spring element. Thus, the various body portions may be identical to one another, symmetrical or asymmetrical, mirror images of one another, or different from one another (e.g., different sizes, shapes, dimensions, orientations within the overall impact-attenuation member, etc.) without departing from this invention.

The spring element may be made from any suitable or desired material, such as polymeric materials, metallic materials and/or a combination thereof capable of changing shape, size, and/or orientation when a force is applied thereto and returning back to or toward their original shape, size, and/or orientation when the force is relieved or relaxed. As more specific examples, the spring element may be made from a polymeric material, such as PEBAX® (a polyether-block co-polyamide polymer available from Atofina Corporation of Puteaux, France). As very specific, non-limiting, examples, the spring element may be made of PEBAX® 5533 or PEBAX® 6333. The size, construction, orientation, material, and/or other properties of the spring element may be freely selected and varied, e.g., to change the overall stiffness, rebound, and/or spring constant characteristics of the impact-attenuation member.

In accordance with at least certain aspects of the invention, the impact-attenuation member may include one or more tension elements. The tension element engages the spring element, directly or indirectly, and stretches under the force applied to the spring element. The tension element operates to restore the impact-attenuation member to its original configuration.

In the context of this aspect of the invention, the stiffness characteristic associated with the impact-attenuation member may be a function of both a stiffness characteristic of the spring element and a stiffness characteristic of the tension element. For example, the stiffness characteristic of the impact-attenuation member may be associated with a stiffness characteristic of the spring element in parallel with a stiffness characteristic of the tension element. Further, the initial stiffness of the impact-attenuation member (i.e. the stiffness characteristic when a load or force is first applied to the impact-attenuation member) may be only a function of the stiffness characteristic of the spring element. As more load is applied to the impact-attenuation member, the stiffness characteristic may become a function of both the stiffness characteristic of the spring element and the tension element. The stiffness characteristic of one or the other of the spring element and the tension element may dominate the stiffness characteristic of the impact-attenuation element at a given load. Thus, it is apparent that the stiffness characteristic of the impact-attenuation member need not actually be a constant, but may vary with the deflection of the impact-attenuation member.

A wide variety of tension element shapes and constructions are possible without departing from this invention. In accordance with some examples of this invention, the tension element may include a planar element. The term "planar" includes elements that are substantially planar, i.e. elements that have a two-dimensional characteristic, but that may deviate from the perfect plane. Thus, a planar tension element may have an overall curvature. Further, the thickness of the planar tension element may vary as it extends across the cavity—going from thin to thick, or thin to thick to thin, or vice versa, for example. To maintain its two-dimensional characteristics, it is expected that the thickness of a planar element, generally and over most of its area, would not exceed one-tenth of the other two maximum dimensions. Optionally, a variation in thickness of the planar element could be repeated such that the tension element may be wavy or crenellated, for example. The variation in thickness could be regular or irregular. Similarly, a planar tension element could be configured as an undulating plane, with the height of the undulations taken as a proxy for the thickness of the element. The undulations may be regular or irregular, smooth, triangulated, square, of constant or varying wavelength or amplitude, etc. As another option, a planar tension element may include ripples, indentations, waves, striations, or other textures on its surface. Further, the planar element may include holes, cutouts, etc.

The tension element may be made from any suitable or desired material, such as polymeric materials, metallic materials and/or a combination thereof that are capable of changing shape, size, and/or orientation when a force is applied thereto and returning back to or toward their original shape, size, and/or orientation when the force is relieved or relaxed. An example of a suitable material is a synthetic or natural rubber or polymeric material (such as an elastomeric material) that is capable of stretching under tensile force and then returning (or substantially returning) to or toward its original size and shape when the force is relieved or relaxed. As more specific examples, the tension element may be made from a polymeric material, such as DESMOPAN® (a thermoplastic polyurethane material available from Bayer AG of Leverkusen, Germany) or PEBAX® (a polyether-block co-polyamide polymer available from Atofina Corporation of Puteaux, France). As very specific, non-limiting, examples, the tension element may be made of PEBAX® 2533, PEBAX® 3533, PEBAX® 4033, PEBAX® 5533, or PEBAX® MX 1205. The size, construction, orientation, material, and/or other properties of the tension element may be freely selected and varied, e.g., to change the overall stiffness, rebound, and/or spring constant characteristics of the impact-attenuation member.

In accordance with other examples, the tension element may be formed of one or more members. The one or more members need not be manufactured of the same or similar materials. As an example, a tension element could include a central element coupled to tension element arms extending from the central element to a perimeter of the cavity. The central element could be polymeric and the arms could be metallic, or vice versa, or any combination of materials. Any desired number of arms and any arrangement of the arms are possible without departing from this invention. For example, in some tension element configurations, a central planar element may extend essentially or substantially all the way to the cavity walls and the arms could be relatively short. In another example, two or more relatively long arms may extend from opposite sides of a relatively compact central element. The arms may be planar or non-planar and having the same or differing lengths and/or thicknesses from each other. In one aspect, the arms may be co-formed with the central element or may be formed separately from the central element and then subsequently joined to the central element. As another example, one or more tension element arms may extend from the central element in parallel with one another, or radiating from a central axis, or at any of various angles. The tension element arms may be evenly or unevenly spaced from one another.

The tension element may be located, wholly or at least partially, within the cavity of the spring element (e.g., within the interior space defined by the spring element). Engagement portions on the tension element allow the tension element to be coupled to or engaged with the spring element. Complementary engagement portions are provided on the spring element. Thus, for example, the tension element may have enlarged engagement portions formed at opposite ends configured for slidably engaging a channel formed in the spring element. In one aspect, the spring element may define one or more engagement portions within the cavity to enable mounting of and engagement with the tension element. A wide variety of tension element and complementary spring element engagement portion configurations are considered possible without departing from the invention. For example, an engagement portion for one of the tension element or spring element may define a chamber, receptacle, notch, passage, etc. into which a portion of the other of the tension element or spring element fits.

Also, if desired, the tension element may be removably or releasably engaged with the tension element engagement portions, e.g., to allow re-orientation of the tension element, interchange of tension elements, etc. For example, the tension element may slidably engage the spring element. In other examples, the tension element may snap into, be clamped to, or be otherwise removably fastened to the spring element. Engagement of the tension element could be accomplished by hand, by use of a hand tool or by machine. Further, engagement of the tension element with the spring element could be accomplished at a factory or at a point of sale (i.e. a retail store). Engagement of the tension element with the spring element at the point of sale allows for customization of the differential-stiffness characteristics of the impact-attenuation members at the point of sale.

In accordance with other exemplary aspects of the invention, the spring element and the tension element may be non-releasably or permanently engaged to each other. For example, the spring element and the tension element may be formed as a unitary body. Optionally, in an over-molding operation, the tension element may be molded right into the spring element during formation of the spring element. In another example, the spring element and the tension element may be initially formed as two or more separate elements, which are subsequently non-releasably joined together to form a one-piece impact-attenuation member. Non-releasable joining methods may include, for example, over-molding, adhesive bonding, locking snap fits, etc.

According to at least some example aspects of the present invention, a method of using an impact-attenuation member of the type described above, and including any of the various structures and features described above, is provided. The method includes: decreasing the height dimension of the impact-attenuation member at the front end as a function of a first spring constant and decreasing the height dimension of the impact-attenuation member at the back end as a function of a second spring constant, wherein the second spring constant differs from the first spring constant. When an applied load is evenly distributed over the member, this method would result in the front and back ends of the member decreasing in height by different amounts. If the applied load is unevenly distributed over the impact-attenuation member, the decrease in height of the front end may be substantially the same as the decrease in height of the back end, but the restoring force developed in the impact-attenuation member at the front end may differ from the restoring force developed in the impact-attenuation member at the back end. According to certain aspects, the method includes increasing a distance between first and second engagement portions of an included tension element, thereby stretching the tension element.

2. Foot-Receiving Device Products Including Differential Stiffness Impact-Attenuation Members and Methods of Using Such Products Additional aspects of this invention relate to foot-receiving device products, such as articles of footwear (including athletic footwear), that include impact-attenuation members, e.g., of the types described above. As a more specific example, foot-receiving device products, such as articles of footwear, in accordance with at least some examples of this invention may include: (a) a foot-covering member (such as an upper member for an article of footwear); (b) a foot-supporting member (such as a sole structure for an article of footwear) engaged with the foot-covering member; (c) a surface-contacting member; and (d) one or more impact-attenuation members engaged with at least one of the foot-covering member, the foot-supporting member or the surface-contacting member. The impact-attenuation member(s) may have a wide variety of structures and features, including any of the various structures and features described above.

The impact-attenuation member(s) may be located at any desired position in a foot-receiving device product structure. For example, in accordance with at least some examples of this invention, the impact-attenuation member(s) may be located in a heel area, a forefoot area, and/or other areas of an article of footwear or other foot-receiving device product, e.g., as part of the sole structure or foot-supporting member structure. Also, the impact-attenuation member(s) may be incorporated into a foot-receiving device product in any desired manner without departing from this invention. For example, if desired, the impact-attenuation member(s) may be included at locations and orientations so as to be at least partially visible from an exterior of the article of footwear. Alternatively, if desired, the impact-attenuation member(s) may be hidden or at least partially hidden in the overall footwear or foot-receiving device product structure, such as within the foam material of a midsole element, within a gas-filled bladder member, etc. Also, any number of individual impact-attenuation member structures may be included in an article of footwear or other foot-receiving device product without departing from this invention.

Specific examples of structures according to the invention are described in more detail below. The reader should understand that these specific examples are set forth merely to illustrate examples of the invention, and they should not be construed as limiting the invention.

C. Specific Examples of the Invention

The various figures in this application illustrate examples of impact-attenuation members, as well as products and methods according to examples of this invention. When the same reference number appears in more than one drawing, that reference number is used consistently in this specification and the drawings to refer to the same or similar parts throughout. In the description above and that which follows, various connections and/or engagements are set forth between elements in the overall structures. The reader should understand that these connections and/or engagements in general and, unless specified otherwise, may be direct or indirect and that this specification is not intended to be limiting in this respect.

FIGS. 1A through 1E illustrate an impact-attenuation member 100 in accordance with an example of this invention. Member 100 includes a spring element 102. In the example embodiment of FIGS. 1A-1E, spring element 102 has three dimensions: length (l), width (w) and height (h), associated with three mutually perpendicular directions: length (L), width (W) and height (H) directions.

Spring element 102 is shown as having a hollow, substantially truncated cone shape. Cavity 104 is provided within spring element 102. In the example of FIGS. 1A-1E, spring element 102 is not exactly conical, but rather has a "squashed," somewhat elliptical cross-section. Further, the wall thickness (t) of spring element 102 varies around the quasi-elliptical circumference.

The length dimension (l) of spring element 102 extends from a front end or surface 110 to a back surface 112. Front surface 110 is shown as being substantially convexly curved. Back surface 112 is shown as being substantially concavely curved. The height dimension (h) of spring element 102 extends from a top surface 120 to a bottom surface 122. Both top surface 120 and bottom surface 122 are shown with flat portions adapted for mounting. Specifically, a first flat portion 124 is provided on top surface 120; a second flat portion 126 is provided on bottom surface 122. The width dimension (w) of spring element 102 extends from a first side surface 130 to a second side surface 132. Side surfaces 130, 132 extend from front surface 110 to back end or surface 112. In FIGS. 1A-1E, and as best shown in FIG. 1E, the width dimension ($w_f$) of spring element 102 at the front surface 110 differs from the width dimension ($w_b$) of spring element 102 at the back surface 112. Furthermore, in this example embodiment, the width dimension (w) varies linearly along at least a portion of the length of spring element 102.

Due to the different dimensions of spring element 102 at front surface 110 and back surface 112, the stiffness characteristic in the height direction of the front surface differs from the stiffness characteristic of the back surface. In other words, the front surface and the back surface will compress different amounts under the same and/or an evenly applied force or load.

Figure 1B:
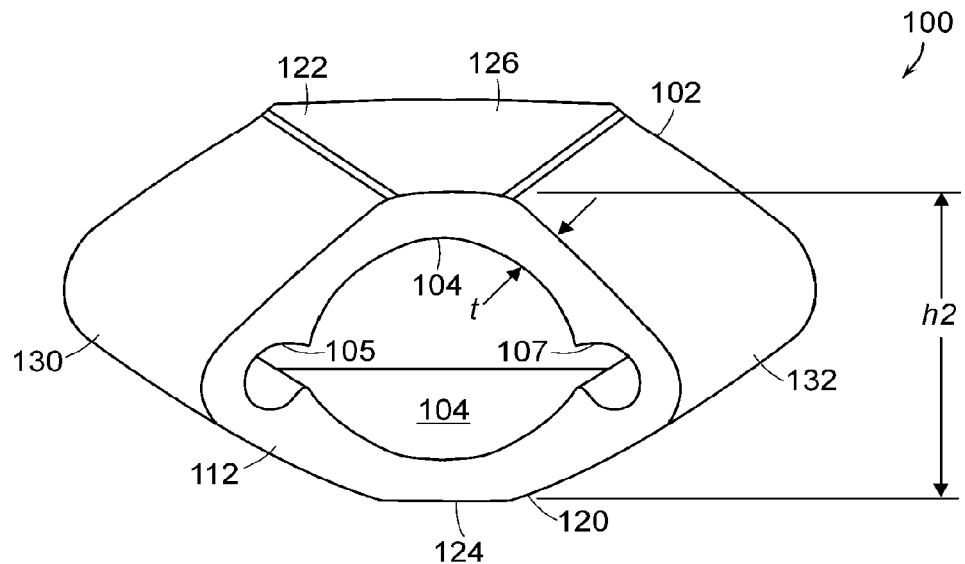
FIG. 1B illustrates a perspective back view of the example impact-attenuation member of FIG. 1A in accordance with this invention.

As an example, referring to FIGS. 1A and 1B, when a force or load (F) is centrally applied to top surface 120 and reacted by bottom surface 122, spring element 102 is compressed in the height direction, i.e. the height dimension (h1) of spring element 102 at the front surface 110 is reduced a certain amount ($\Delta h1$) and the height dimension (h2) at the back surface 112 is reduced a certain amount ($\Delta h2$) Due to the differential stiffness characteristics of the spring element at its front and back surfaces, the amount of reduction $\Delta h1$ differs from the amount of reduction $\Delta h2$. At the same time the width dimension (w) of spring element 102 is increased. Upon removal of the force, spring element 102 returns to its non-deformed configuration and energy that was stored in spring element 102 due to its elastic deformation is released.

When viewed from the top, as best illustrated in FIG. 1E, the cross-sectional shape of spring element 102 may substantially be a truncated sector of a circle having a sector angle ($\theta$). As shown in FIG. 1E in this example structure 100, front surface 110 closely follows a circular arc, whereas back surface 112 deviates from a true circular arc.

FIG. 1E also illustrates another characteristic of the spring element 102. A first plane P1 extending in the height direction and the length direction can be positioned so as to symmetrically bisect spring element 102. However, a second plane P2 extending in the height direction and the width direction, thereby being mutually perpendicular to the first plane, cannot be positioned anywhere so as to symmetrically bisect spring element 102. Indeed, of any two mutually perpendicular planes, each extending in the height direction, there is no placement that would result in the spring element being symmetrically bisected by both planes. In other words, at most, one of two mutually perpendicular planes, each extending in the height direction, defines a plane of symmetry of spring element 102. In FIG. 1E, one plane (P1) defines a plane of symmetry of the spring element.

Figure 1C:
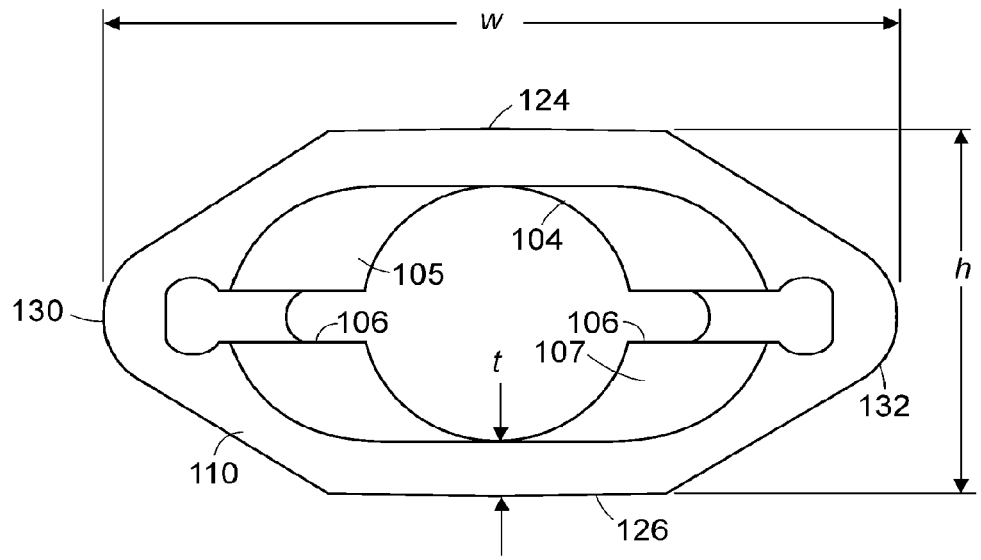
FIG. 1C illustrates a front view of the example impact-attenuation member of FIG. 1A in accordance with this invention.
Figure 1D:
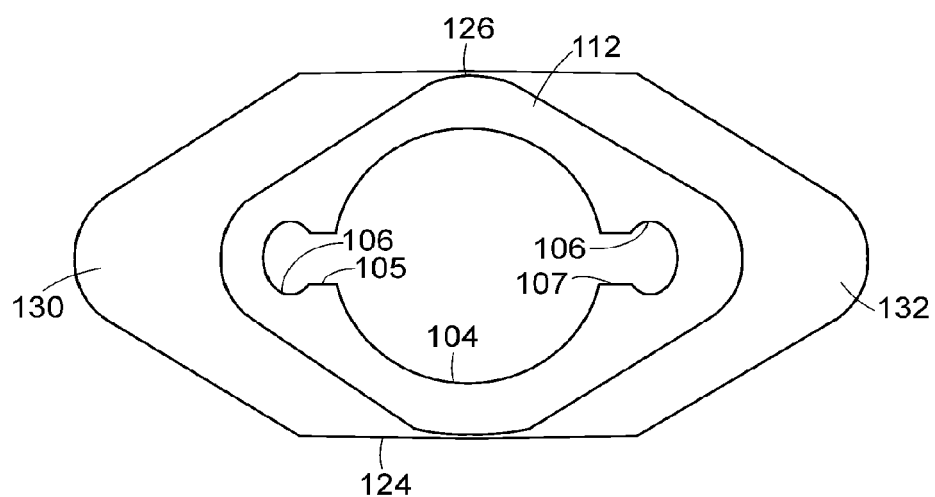
FIG. 1D illustrates a back view of the example impact-attenuation member of FIG. 1A in accordance with this invention.
Figure 1E:
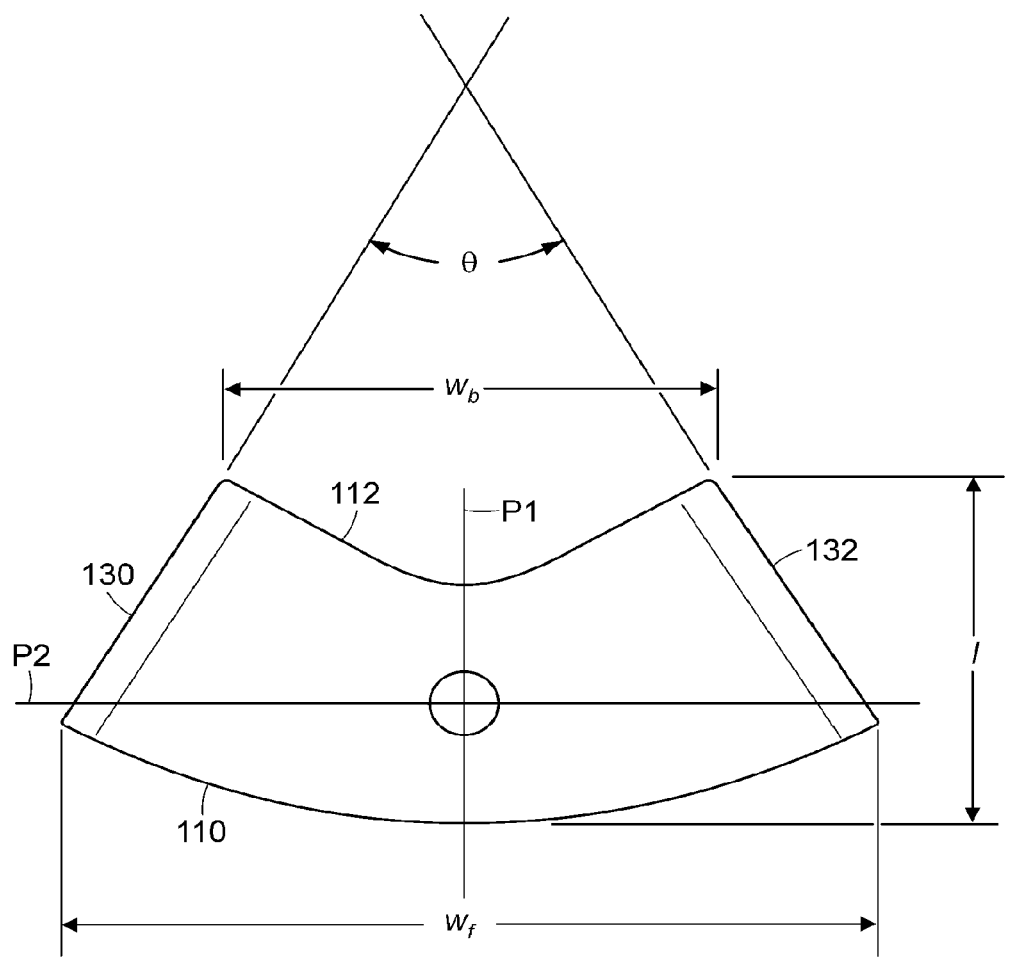
FIG. 1E illustrates a top view of the example impact-attenuation member of FIG. 1A in accordance with this invention.
Figure 2A:
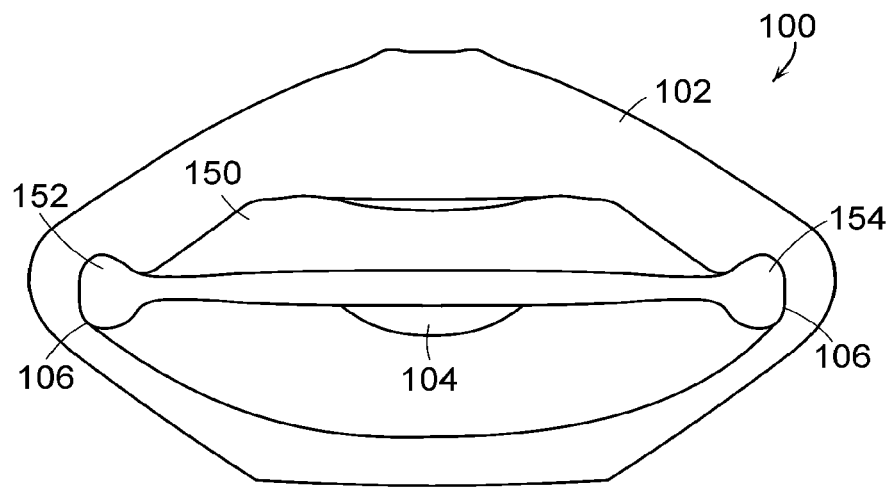
FIG. 2A illustrates a perspective front view of another example impact-attenuation member in accordance with this invention.
Figure 2B:
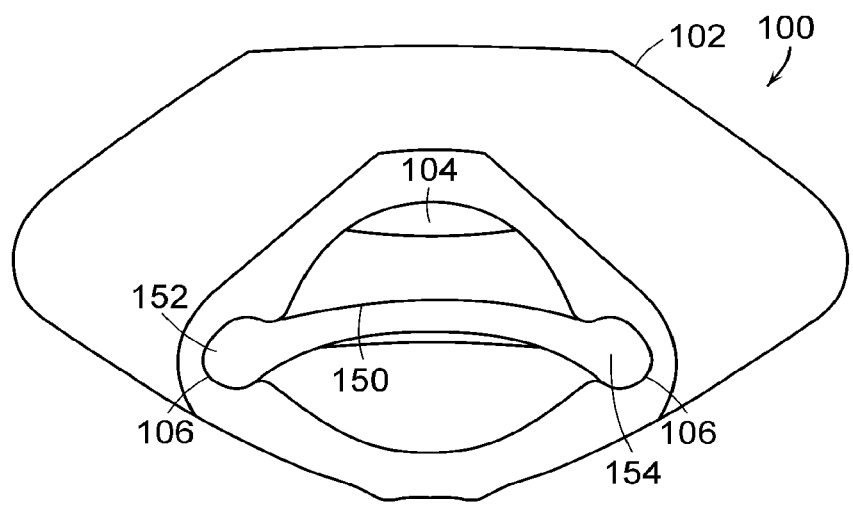
FIG. 2B illustrates a perspective back view of the example impact-attenuation member of FIG. 2A in accordance with this invention.
Figure 2C:
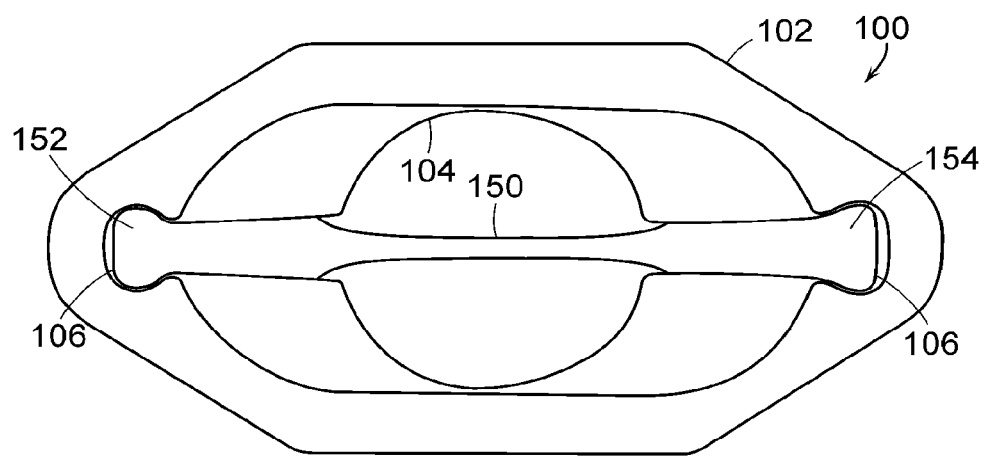
FIG. 2C illustrates a front view of the example impact-attenuation member of FIG. 2A in accordance with this invention.
Figure 2D:
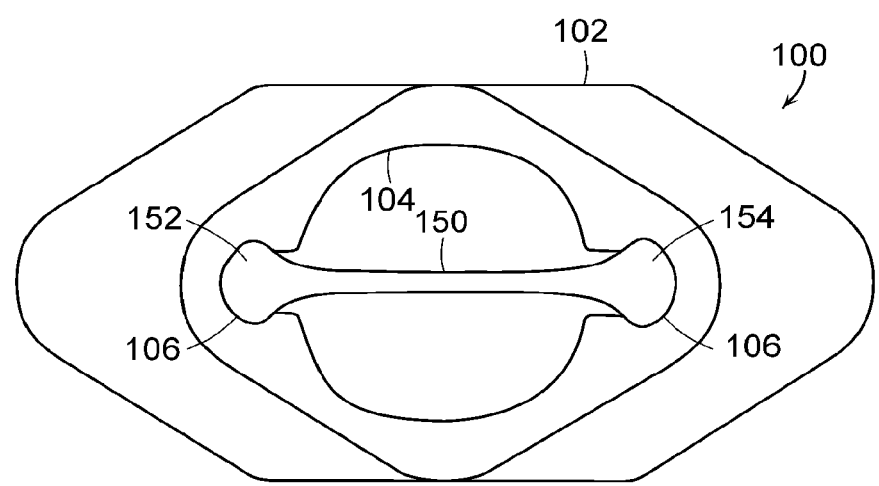
FIG. 2D illustrates a back view of the example impact-attenuation member of FIG. 2A in accordance with this invention.

Cavity 104 is formed within spring element 102. In the embodiment of FIGS. 1A-1E, cavity 104 is open at front surface 110 and open at back surface 112 and extends from cavity side wall 105 to cavity side wall 107. As best shown in FIGS. 1C and 1D, cavity 104 may include receptacles 106 defined by side walls 105, 107. Receptacles 106 extend along the length of spring element 102.

FIGS. 2A through 2D illustrate an impact-attenuation member 100 in accordance with another embodiment of this invention. Member 100 includes a spring element 102, similar to that described above, and further includes a tension element 150. Tension element 150 is located within cavity 104 and extends across the width dimension of cavity 104. Specifically, tension element 150 extends across cavity 104 and engages spring element 102 at receptacles 106.

In FIGS. 2A-2D, tension element 150 is substantially planar. On either side of tension element 150 are provided enlarged portions 152, 154. Enlarged portions 152, 154 are configured to engage receptacles 106. The engagement may be accomplished via relative sliding of the enlarged portions 152, 154 with receptacles 106, via snap-in motion accompanied by elastic deformation of the enlarged portions 152, 154 and/or of receptacles 106, or via a combination of relative sliding and snap-in motion. Further, the engagement of tension element 150 to spring element 102 could be releasable or non-releasable.

Tension element 150 need not be planar, nor need tension element 150 be a unitary piece. Thus, tension element 150 may be formed of two or more pieces, each extending across a portion of the cavity width dimension. Further, the pieces may be releasably or nonreleasably coupled to one another.

Furthermore, more than one tension element may be associated with any one spring element 102. Thus, by way of non-limiting example, first and second planar tension elements may be stacked one on top of another in the height direction of spring element 102 or first and second tension elements may be positioned side-by-side in the length direction of spring element 102.

Tension element 150 may have substantially the same cross-sectional shape as cavity 104 of spring element 102, when spring element is viewed from the top (see FIGS. 3A-3I). Alternatively, tension element 150 may extend outside cavity 104 or tension element 150 may lie completely within the boundaries of cavity 104.

When a force or load is applied to top surface 120 and reacted by bottom surface 122, spring element 102 is compressed in the height direction, i.e. the height dimension (h) of spring element 102 is reduced. Receptacles 106 close down and increase their grip on enlarged portions 152, 154 of tension element 150. At the same time, as the width dimension (w) of spring element 102 is increased, the width dimension of tension element 150 is increased. Upon removal of the force, spring element 102 and tension element 150 return to their non-deformed configurations and energy that was stored in spring element 102 and in tension element 150 due to their elastic deformations is released.

As will be apparent to persons of skill in the art given the benefit of the disclosure of this application, the stiffness characteristics of the impact-attenuation members of the present invention are functions of the physical dimensions and configurations of spring element 102 and/or tension element 150 and also of the materials used to form spring element 102 and tension element 150. It will also be apparent to persons of skill in the art given the disclosure of this application that pairing any given configuration of spring element 102 with differing configurations and/or materials of tension element 150 would result in different stiffness characteristics for the impact-attenuation members. Thus, the stiffness characteristics for the impact-attenuation members may be tailored to specific applications by tailoring the individual stiffness characteristics of one or both of the spring element 102 and the tension element 150.

Figure 3A:
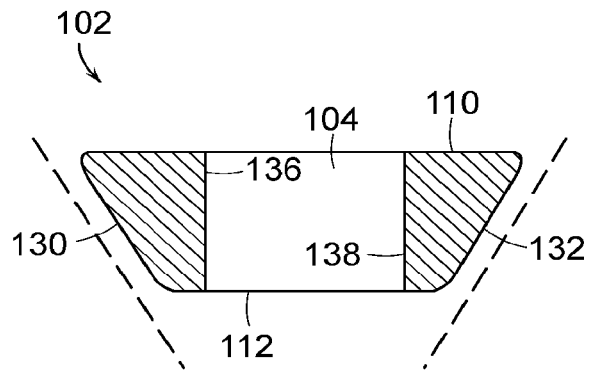
FIGS. 3A through 3I illustrate exemplary cross-sectional shapes of impact-attenuation members in accordance with this invention.

Cross-sectional shapes of spring element 102, when viewed from the top, according to various example embodiments of the present invention are illustrated in FIGS. 3A-3I. FIG. 3A illustrates an embodiment of spring element 102 wherein the front surface 110 and the back surface 112 are not curved, but rather are flat. In cross-section, side walls 130, 132 of spring element 102 are angled in from front surface 110 to back surface 112 in a straight line, and thus, the width dimension varies linearly along the length of the spring element. In this particular embodiment, side walls 136 and 138 of cavity 104 extend in straight lines from front surface 110 to back surface 112. Furthermore, side walls 136, 138 of cavity 104 are parallel to one another. The parallel side walls 136, 138 of the embodiment of FIG. 3A would facilitate a sliding insertion/engagement of any tension element 150 having corresponding parallel side surfaces.

Figure 3B:
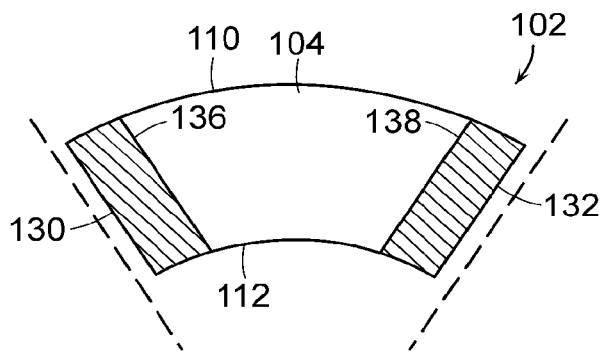

FIG. 3B illustrates an embodiment of spring 102 wherein both the front surface 110 and the back surface 112 are true circular arcs. Front surface 110 is convexly curved; back surface 112 is concavely curved. Side walls 130, 132 of spring element 102 follow the radial lines of the circle defining the sector. The width dimension varies linearly along the length of the spring element 102. Side walls 136, 138 of cavity 104 extend in straight lines from front surface 110 to back surface 112 and are shown parallel to side walls 130, 132, respectively. Insertion/engagement of a tension element having angled side surfaces corresponding to side walls 136, 138 of the spring element shown in FIG. 3B would most likely require a snapping or relative deformation of the spring element and/or the tension element.

Figure 3C:
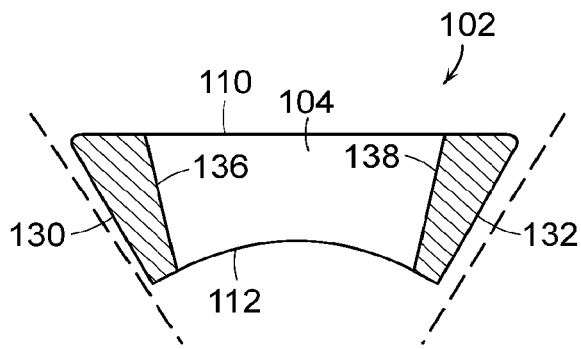

FIG. 3C illustrates an embodiment of spring 102 wherein the front surface 110 is flat and the back surface 112 is a true circular arc. Back surface 112 is concavely curved. In this embodiment, side walls 130, 132 of spring element 102 follow the radial lines of the circle defined by back surface 112. Side walls 136, 138 of cavity 104 extend in straight lines from front surface 110 to back surface 112 and are neither parallel to one another nor parallel to side walls 130, 132.

Figure 3D:
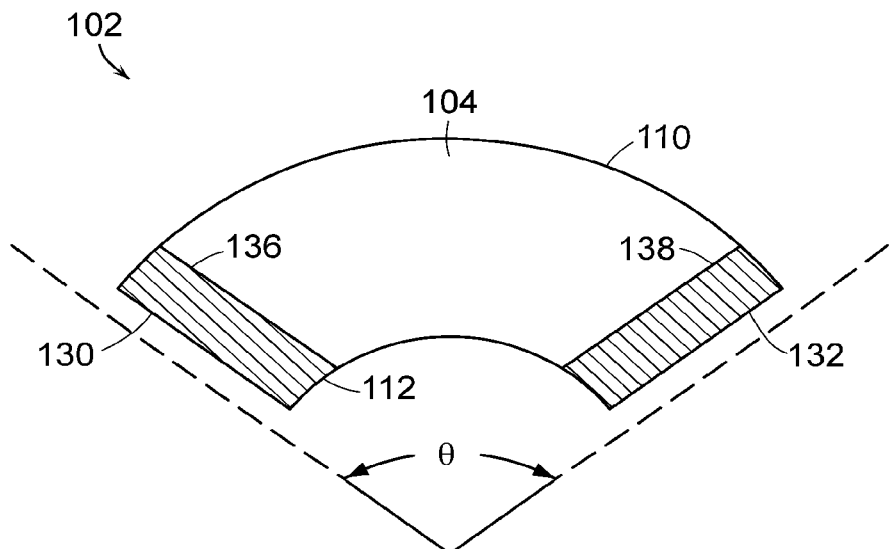
Figure 3E:
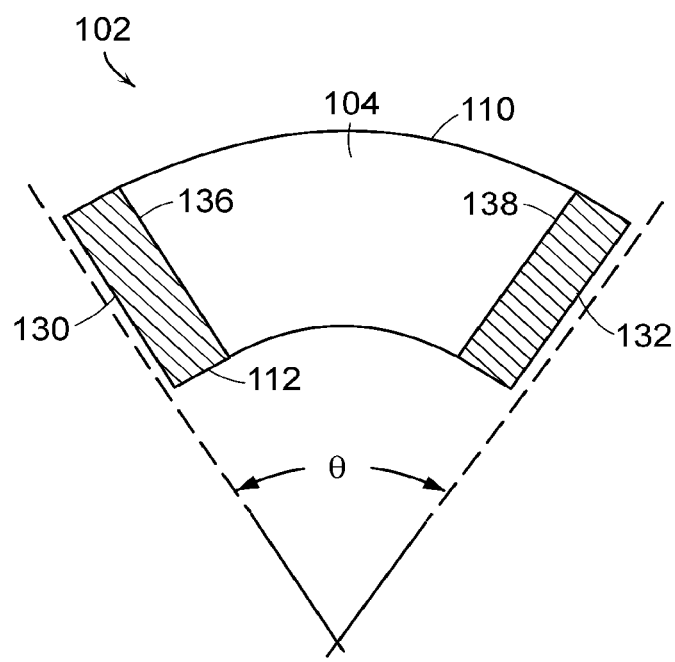

FIGS. 3D and 3E show that the sector angle (A) can be any suitable angle, including, obtuse (see FIG. 3D), acute (see FIG. 3E) or even a right angle.

Figure 3F:
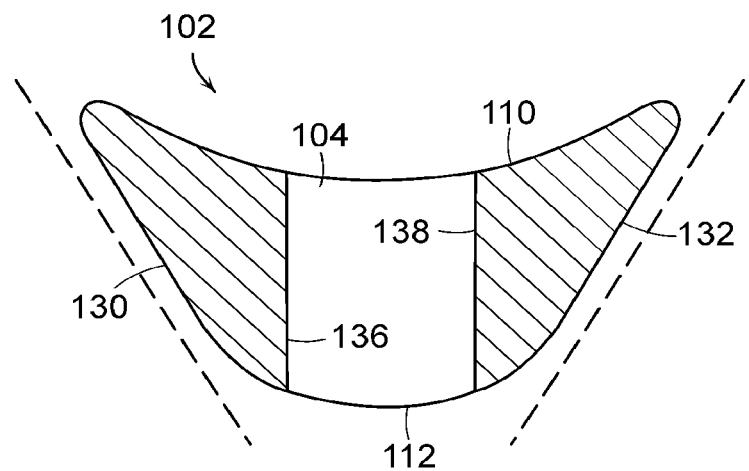

FIG. 3F illustrates the cross-sectional shape, when viewed from the top, of an alternative embodiment of spring element 102. In FIG. 3F, front surface 110 is concavely curved and back surface is convexly curved. Side walls 130, 132 are shown as straight lines that angle in toward one another so that, once again, the width dimension varies along the length of the spring element. Thus, it is apparent that the front surface may be convex, concave, flat or a combination thereof. Similarly, the back surface may be convex, concave, flat or a combination thereof.

Figure 3G:
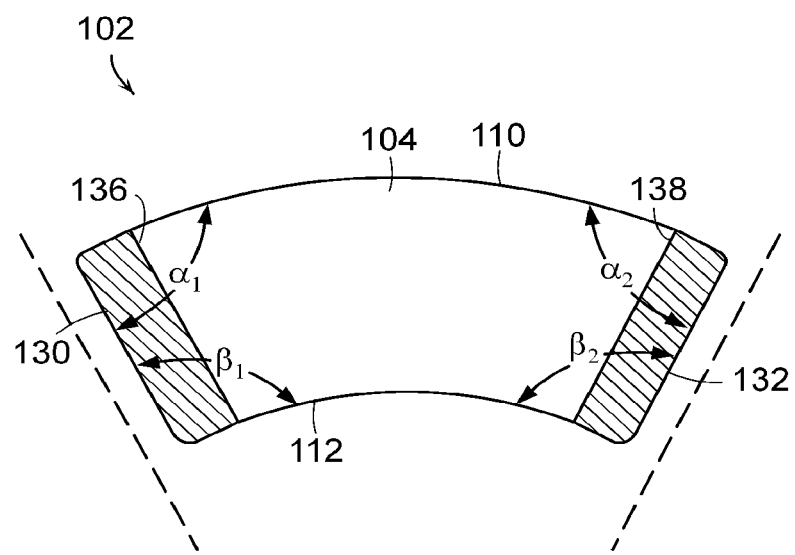

FIG. 3G illustrates the cross-sectional shape, when viewed from the top, of even another embodiment of spring element 102. In FIG. 3G, the cross-sectional shape of spring element 102 is not symmetric. Front surface 110 is convexly curved and back surface 112 is concavely curved. Side walls 130, 132 extend in straight lines from the front to the back surfaces. However, the angle ($\alpha_1$) formed between the side wall 130 and the front surface 110 and the angle ($\alpha_2$) formed between the side wall 132 and the front surface 110 are not equal. Similarly, the angle ($\beta_1$) formed between the side wall 130 and the back surface 112 and the angle ($\beta_2$) formed between the side wall 132 and the back surface 112 are not equal. In this embodiment, side walls 136, 138 of cavity 104 extend in straight lines from front surface 110 to back surface 112 and are parallel to side walls 130, 132 of spring element 102, respectively.

Figure 3H:
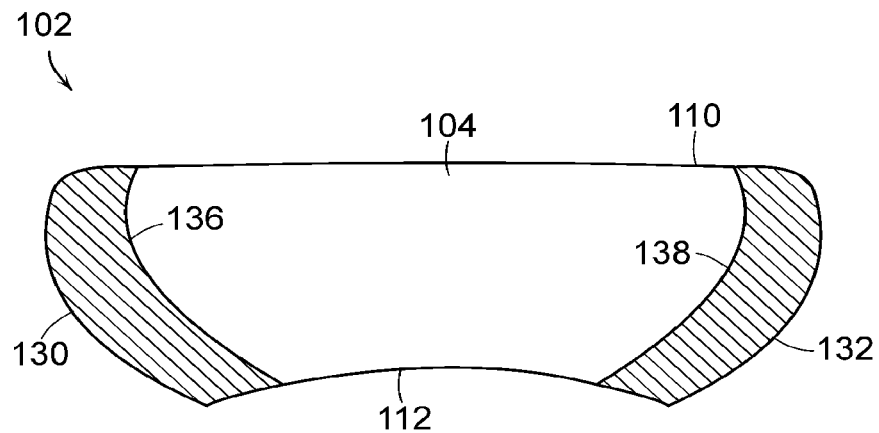
Figure 3I:
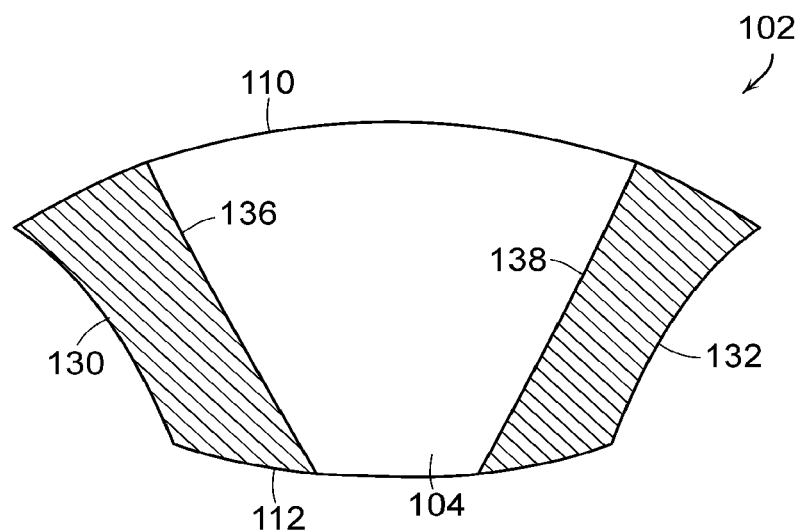

In certain embodiments, side walls 130, 132 of spring element 102 need not be straight. As illustrated in FIGS. 3H and 3I, side walls 130, 132 may assume various cross-sectional shapes. In FIG. 3H, the side walls 130, 132 are convexly curved; in FIG. 3I, the side walls 130, 132 are concavely curved. Similarly, side walls 136, 138 of cavity 104 need not be straight. As shown in FIG. 3H, side walls 136, 138 are curved and parallel to side walls 130, 132, respectively.

Figure 4A:
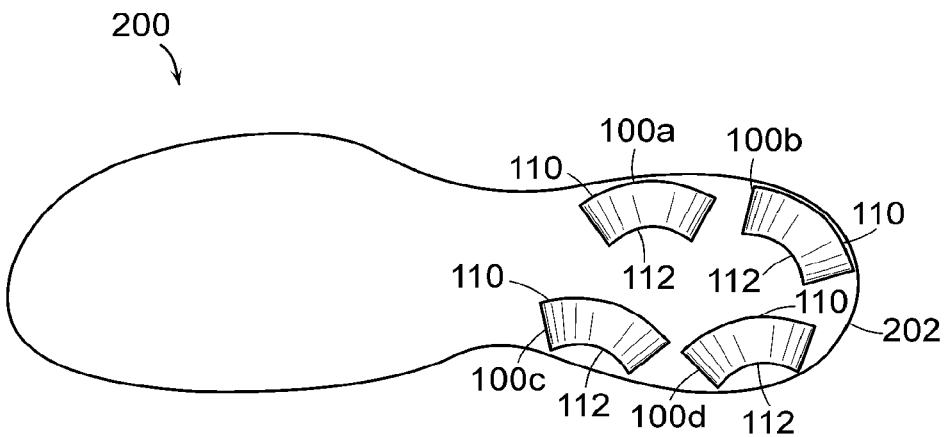
FIGS. 4A through 4C illustrate exemplary placements of impact-attenuation members on an article of footwear in accordance with this invention.
Figure 4B:
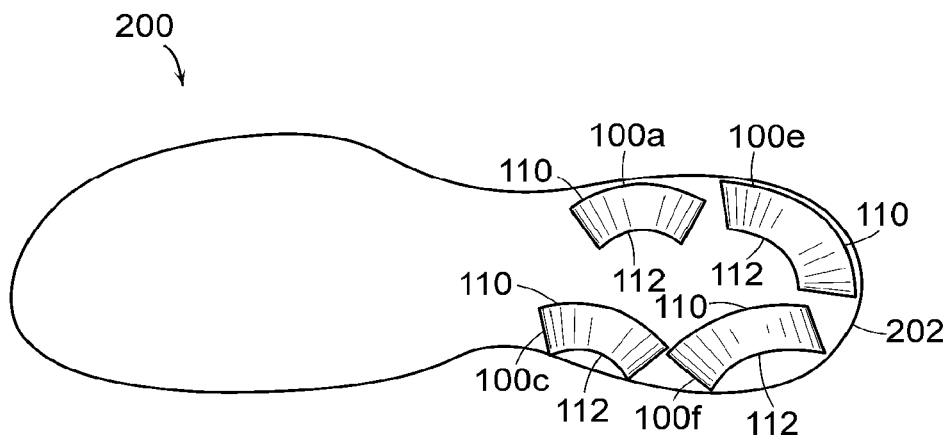
Figure 4C:
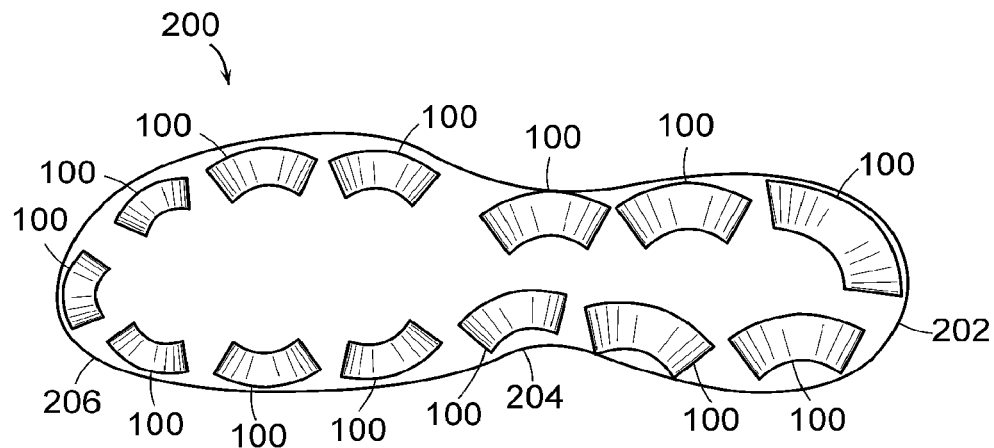

An outline of a foot-receiving device 200 is shown in FIGS. 4A-4C with exemplary placements of the impact-attenuation members according to the present invention. In each of FIGS. 4A-4C, the individual impact-attenuation members are designed and placed so as to customize and/or optimize the overall impact-attenuation characteristics of the foot-receiving device. If desired, the outer edges of the spring elements may be made to match the general shape of the outer edge of the foot-receiving device.

FIG. 4A illustrates four identical or substantially similar impact-attenuation members 100 positioned in the heel area 202 of the foot-receiving device 200. Each impact-attenuation member has a convexly-curved front surface 110 and a concavely-curved back surface 112. In this example, the convexly-curved front surface portions of the spring elements have a lower stiffness than the concavely-curved back surfaces portions. Impact-attenuation members 100*a* and 100*b* are positioned under the outside portion of heel area 202; impact-attenuation members are positioned under the inside portion of heel area 202. In particular, the convexly-curved surface portions, i.e. the lower stiffness regions, of impact-attenuation members 100*a* and 100*b* are positioned in the vicinity of the lateral perimeter of heel area 202. Conversely, the concavely-curved surface portions, i.e. the higher stiffness regions, of impact-attenuation members 100*c* and 100*d* are positioned in the vicinity of the medial perimeter of heel area 202.

As another example, in FIG. 4B, two identical or substantially similar impact-attenuation members 100*a* and 100*c* are positioned toward the front of the heel area 202 of the foot-receiving device 200, similar to their placement in FIG. 4A. In addition, two different, non-similar impact-attenuation members 100*e* and 100*f* are positioned toward the back of the heel area 202. In this example, the overall stiffnesses of impact-attenuation members 100*e* and 100*f* is generally lower that the overall stiffnesses of impact-attenuation members 100*a* and 100*c*. As with FIG. 4A, each impact-attenuation member has a convexly-curved front surface 110 and a concavely-curved back surface 112 and the convexly-curved front surface portions of the spring elements have a lower stiffness than the concavely-curved back surfaces portions. The convexly-curved surface portions, i.e. the lower stiffness regions, of impact-attenuation members 100*a* and 100*e* are positioned in the vicinity of the outside perimeter of heel area 202. Conversely, the concavely-curved surface portions, i.e. the higher stiffness regions, of impact-attenuation members 100*c* and 100*f* are positioned in the vicinity of the inside perimeter of heel area 202. Because impact-attenuation members 100*e* and 100*f* of FIG. 4B are generally less stiff than impact-attenuation members 100*b* and 100*d* of FIG. 4A, the heel strike zone of the foot-receiving device of FIG. 4B is softer than the heel strike zone of the foot-receiving device of FIG. 4A. By appropriate selection of stiffness in the various regions of the article of footwear, various gait or stride issues may be corrected or improved, such as over pronation.

As another example, FIG. 4C illustrates a variety of impact-attenuation members positioned under the heel area 202, under the mid-foot area 204 and under the forefoot (i.e. the toe/ball-of-the-foot) area 206 of the foot-receiving device 200. Note that in the forefoot area, the convexly-curved surface portions of the impact-attenuation members all are positioned in the vicinity of the perimeter. From the illustrations of FIGS. 4A-4C, it is shown that a variety of impact-attenuation members 100 can be placed on foot-receiving devices in any manner to suitably facilitate the overall stiffness and impact-attenuation characteristics of the foot-receiving device.

Figure 5A:
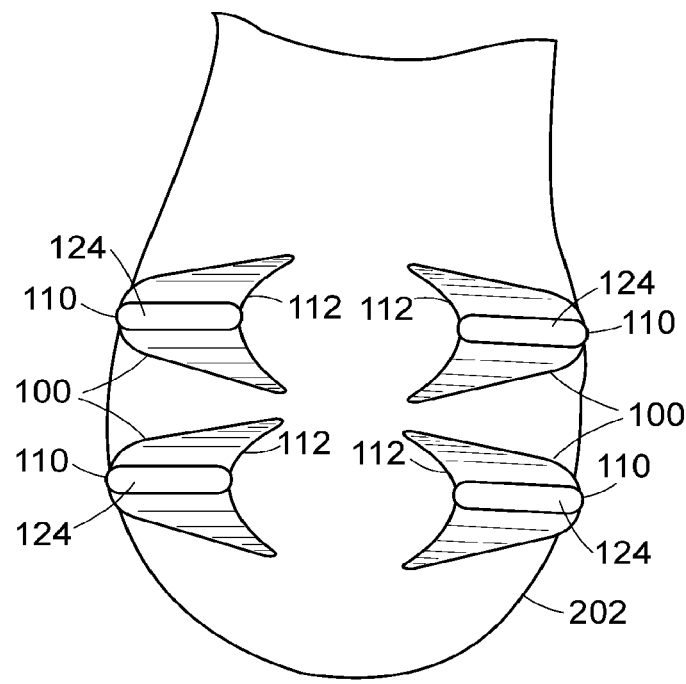
FIGS. 5A through 5D illustrate exemplary placements of impact-attenuation members on the heel area of an article of footwear in accordance with this invention.
Figure 5B:
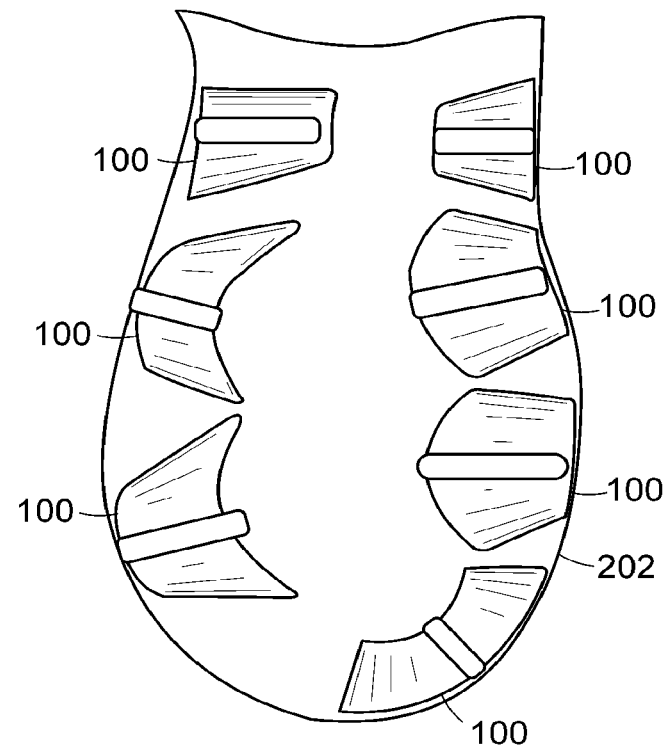
Figure 5C:
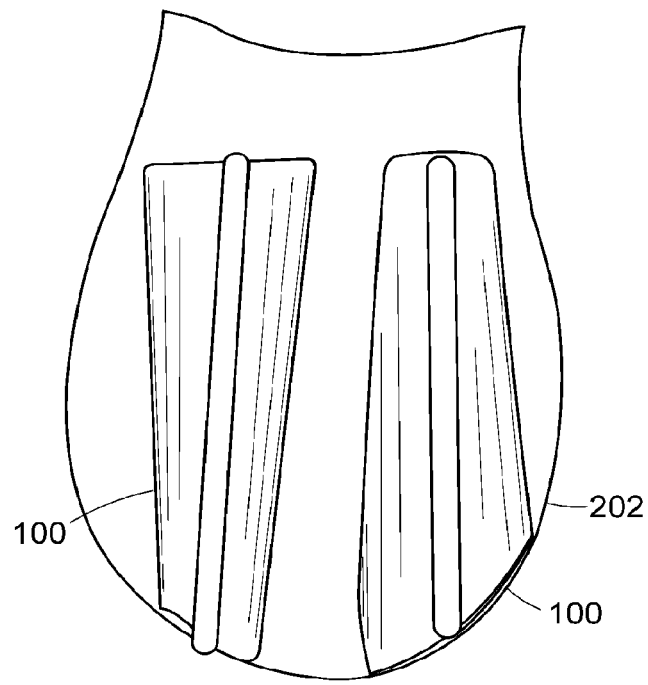
Figure 5D:
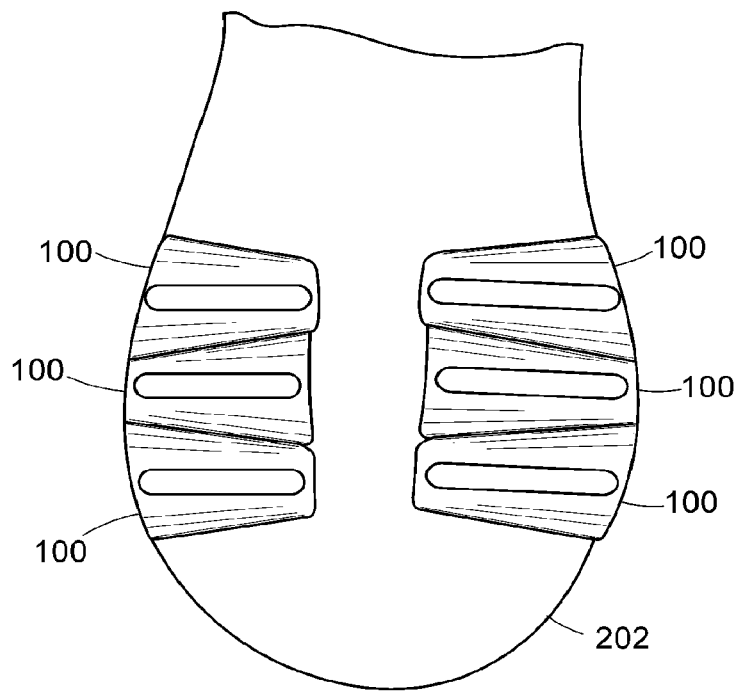

An outline of the heel area 202 of a foot-receiving device 200 is shown in FIGS. 5A-5D with exemplary placements of various example impact-attenuation members according to the present invention. In FIG. 5A, four identical or substantially similar impact-attenuation members 100 are positioned in heel area 202. Each impact-attenuation member includes a flat portion 124 for facilitating mounting of the impact-attenuation member to a structure associated with the foot-receiving device. In this figure, the four impact-attenuation members are positioned roughly symmetrically about a mid-line of the heel area, with convexly-curved front surface portions 110 positioned in the vicinity of the perimeter of the heal area and with concavely-curved back surface portions 112 positioned towards the mid-line of the heel area. FIGS. 5B-5D illustrate other possible placements and orientations of various impact-attenuation members 100 in heel area 202. Of note in FIG. 5D is that the impact-attenuation members 100 may be positioned adjacent one another, for example, a side wall of one impact-attenuation member 100 may be positioned adjacent a side wall of another impact-attenuation member 100.

Figure 6A:
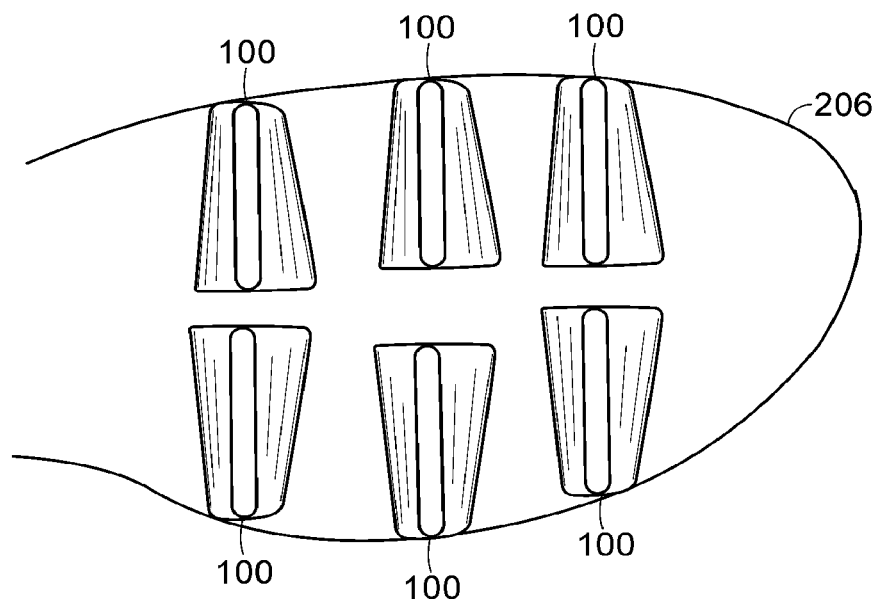
FIGS. 6A through 6C illustrate exemplary placements of impact-attenuation members on the forefoot area of an article of footwear in accordance with this invention.
Figure 6B:
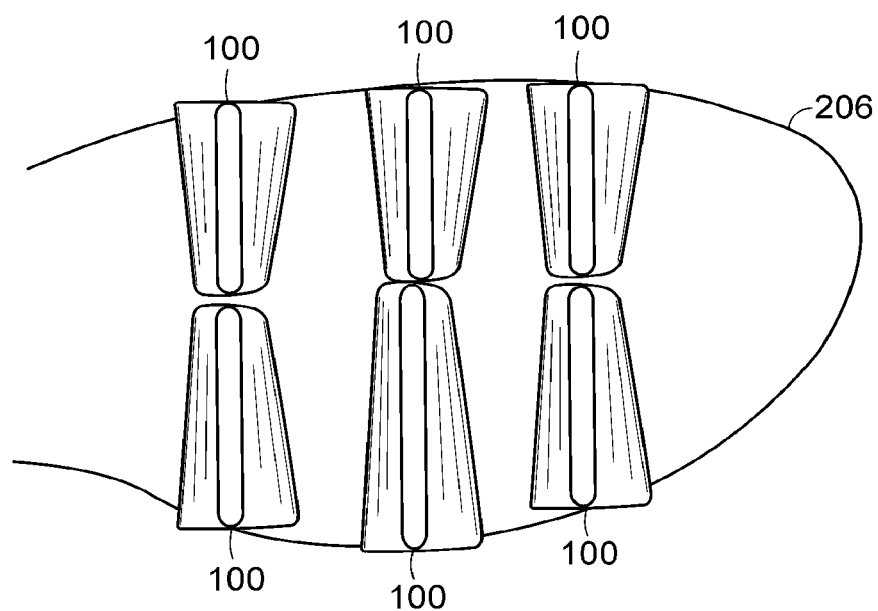
Figure 6C:
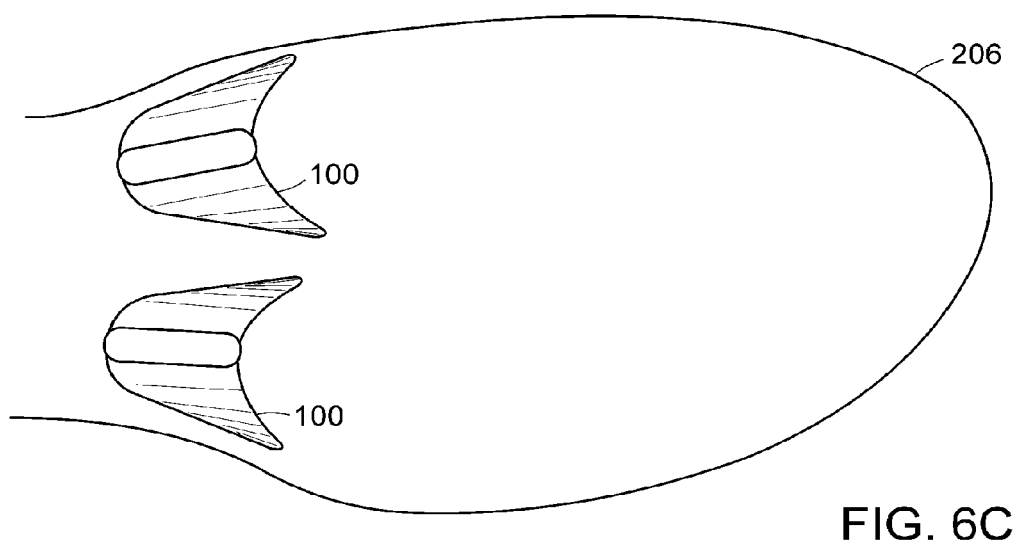

An outline of the forefoot area 206 of a foot-receiving device 200 is shown in FIGS. 6A-6C with various exemplary placements and orientation of various impact-attenuation members 100 according to exemplary embodiments of the present invention.

Figure 7:
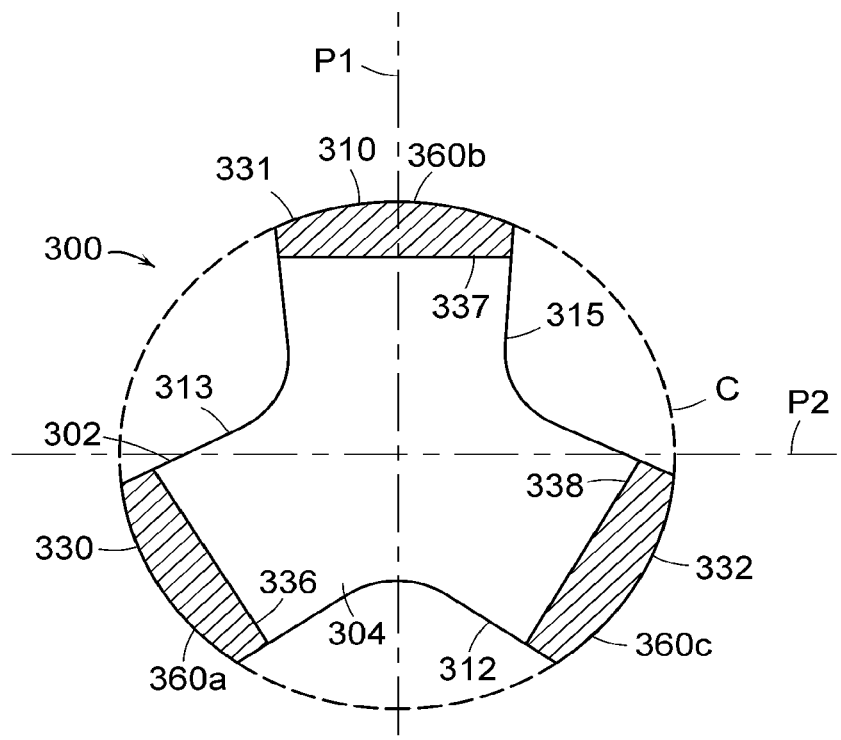
FIG. 7 illustrates an exemplary cross-sectional shape of even another example impact-attenuation member in accordance with this invention.

FIG. 7 illustrates an impact-attenuation member 300 in accordance with a further example of this invention. FIG. 7 is a cross-section of impact-attenuation member when viewed from the top. Member 300 includes a spring element 302. In the particular embodiment of spring element 302 shown in FIG. 7, spring element 302 has a triangulated configuration, e.g., a tri-lobed or tri-legged configuration. Each lobe 360*a*, 360*b*, 360*c* extends radially outward from the center of the spring element to a common circumference (C). Each lobe 360*a*, 360*b*, 360*c* ends at a spring element wall 330, 331, 332, respectively. In FIG. 7, walls 330, 331, 332 are shown as arcs of a circle, but could be flat, concavely curved or otherwise convexly curved. Spring element includes cavity 304 extending within each lobe 360*a*, 360*b*, 360*c* to cavity walls 336, 337, 338, respectively. In FIG. 7, cavity walls 336, 337, 338 are shown as flat portions, but could be curved. Further, in FIG. 7, although cavity 304 is shown as extending within each lobe the same amount, this need not be the case. Spring element 302 includes a front end or surface 310, which is coincident with spring element wall 331. Spring element 302 also includes a back end or surface 312, which is located between lobes 360*a* and 360*c*. Front surface 310 is convexly curved. Back surface 312 is concavely curved. Furthermore, back surface 312 includes an opening into cavity 304. Spring element 302 also includes other surfaces 313, 315 located between adjacent lobes, each surface 313, 315 also including an opening into cavity 304.

Figure 8:
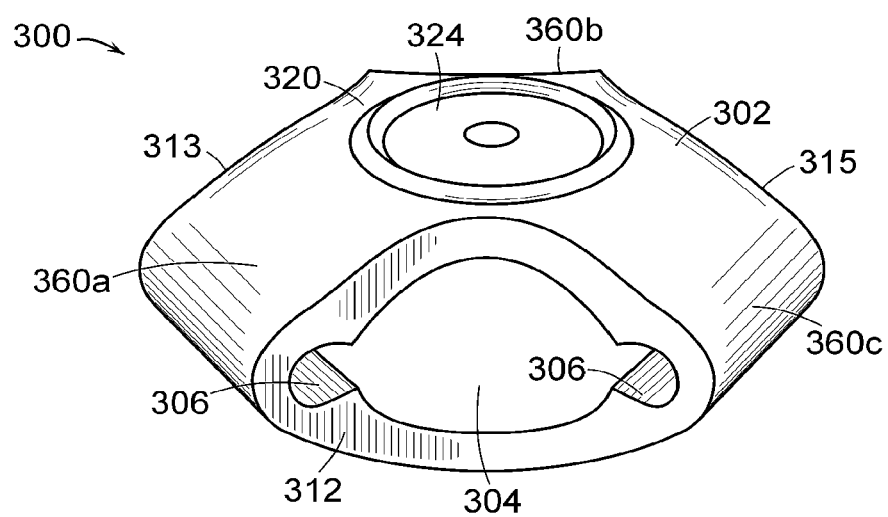
FIG. 8 illustrates a perspective front view of another example impact-attenuation member in accordance with this invention.

FIG. 8 is a perspective view of a spring element similar to the spring element 302 of FIG. 7. In this example embodiment, the walls 330, 331, 332 are flat or straight across, as opposed to the circular arcs depicted in FIG. 7. As shown in the perspective view of FIG. 8, spring element 302 assumes a substantially spherical shape. More specifically, spring element 302 assumes a somewhat "squashed" spherical shape, much like a flying saucer. A central circular flat portion 324 is provided on top surface 320. Portion 324 provides a surface for mounting impact-attenuation member 100 to, for example, a foot-receiving device. Also as best shown in FIG.

8, spring element 302 may include one or more receptacles 306. Receptacles 306 extend across the widths of lobes 160a-160c of spring element 102.

Due to the different configurations of spring element 302 at front surface 310 and back surface 312, the stiffness characteristic in the height direction of the front surface differs from the stiffness characteristic in the height direction of the back surface. In other words, the front surface 310 and the back surface 312 will compress different amounts under the same applied force or load.

Referring back to FIG. 7 another characteristic of spring element 302 is illustrated. A first plane P1 extending in the height direction and the length direction is positioned so as to symmetrically bisect spring element 302. However, a second plane P2 extending in the height direction and the width direction, thereby being mutually perpendicular to the first plane, cannot be positioned anywhere so as to symmetrically bisect spring element 302. Indeed, of any two mutually perpendicular planes, each extending in the height direction, there is no placement that would result in spring element 302 being symmetrically bisected by both planes. In other words, at most, one of two mutually perpendicular planes, each extending in the height direction, defines a plane of symmetry of spring element 302. In FIG. 7, one plane (P1) defines a plane of symmetry of the spring element.

With all other features fixed (e.g., height, thickness, material, mounting method, etc.), varying the extension, or length, of the leg changes the stiffness characteristic of the impact-attenuation member. Thus, increasing the length of the legs decreases the stiffness characteristic of the impact-attenuation member. Decreasing the length of the legs increases the stiffness characteristic of the impact-attenuation member.

Figure 9:
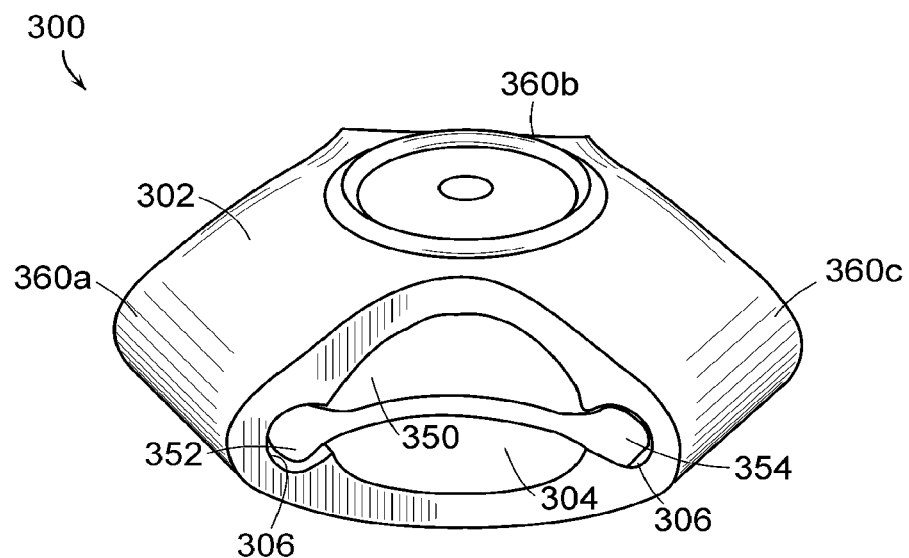
FIG. 9 illustrates a perspective front view of even another impact-attenuation member in accordance with this invention.

FIG. 9 is a perspective view of an impact-attenuation member 300 in accordance with another embodiment of this invention. Member 300 includes a spring element 302, similar to that described above, and further includes a tension element 350. Tension element is located with cavity 304 and extends within lobes 360a-360c and across a width dimension of cavity 304. Specifically, tension element 350 extends across cavity 304 and engages spring element 302 at receptacles 306.

Figure 10:
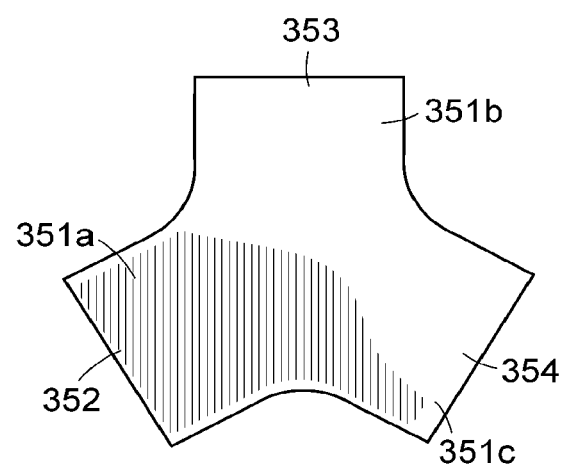
FIG. 10 illustrates a top view of a tension element of the impact-attenuation member of FIG. 9 in accordance with this invention.

As best shown in FIG. 10, tension element 350 includes three arms 351a, 351b, 351c extending radially outward from the center of the tension element. Tension element is substantially planar. At the distal end of arms 351a, 351b, 351c of tension element 350 are provided enlarged portions 352, 353, 354. Enlarged portions 352, 353, 354 are configured to engage receptacles 306 of spring element lobes 360a, 360b, 360c.

Figure 13:
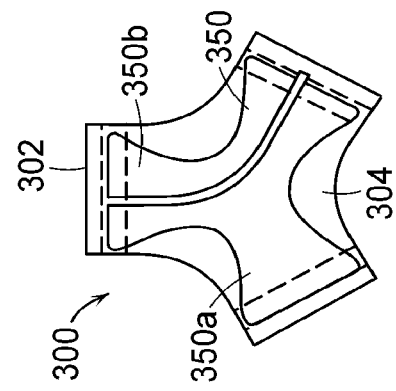
FIG. 13 shows a top view of a further exemplary tension element and an impact-attenuation member including the tension element in accordance with the invention.
Figure 13:
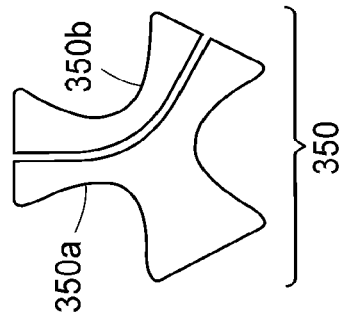
Figure 12:
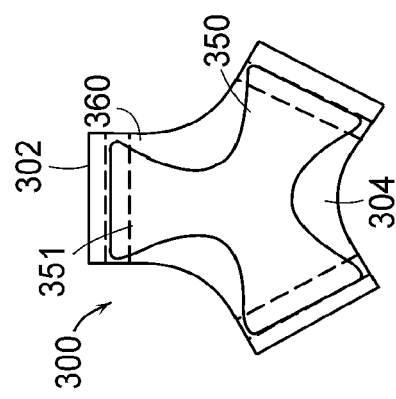
FIG. 12 shows a top view of another exemplary tension element and an impact-attenuation member including the tension element in accordance with the invention.
Figure 12:
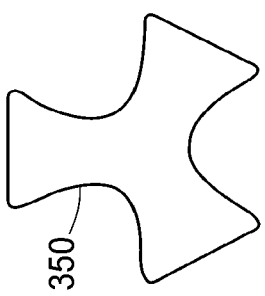
Figure 11:
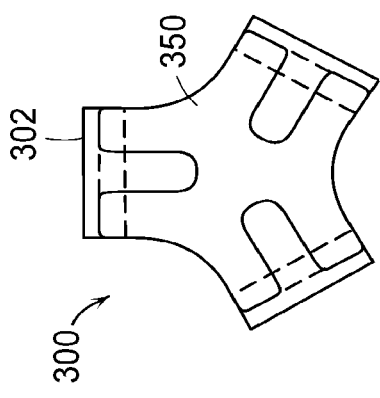
FIG. 11 shows a top view of an exemplary tension element and an impact-attenuation member including the tension element in accordance with the invention.
Figure 11:
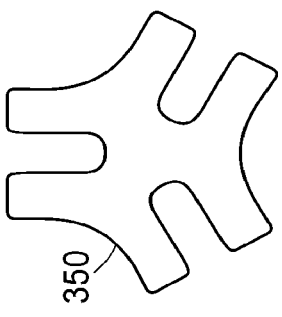
Figure 14:
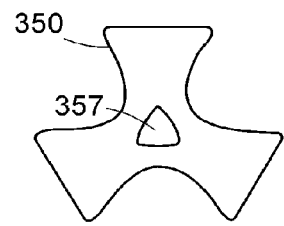
FIG. 14 shows a top view of even another exemplary tension element and an impact-attenuation member including the tension element in accordance with the invention.

As with tension element 150, tension element 350 could assume any suitable configuration as would be available to a person of ordinary skill in the art given the benefit of the disclosure of this application. For example, referring to FIG. 11 tension element 350 may have multiple arms extending toward and engaging a single lobe of spring element 302. As shown in FIG. 12, tension element 350 may lie completely within, but not coextensive with, cavity 304—in this example embodiment, arms 351 curve inward more that lobes 360. Thus, it can be seen that tension element 350 need not have a profile that corresponds to the profile of cavity 304. Further, as shown in FIG. 13 tension element 350 may be formed of one or more pieces 350a, 350b sharing the same spring element cavity. The pieces may be connected with one another or not connected, as shown. As shown in FIG. 14, tension element 350 may have one or more cutouts 357. By way of other non-limiting examples, tension elements 350 may extend between less than all the lobes of spring element 302, may be symmetric or non-symmetric, may be circular and thereby extend outside the openings to cavity 304, etc. The stiffness or elastic properties of the tension elements are functions of the materials and geometries of the tension elements, thus, different geometries for the tension elements result in different elastic properties for the tension elements.

Figure 15:
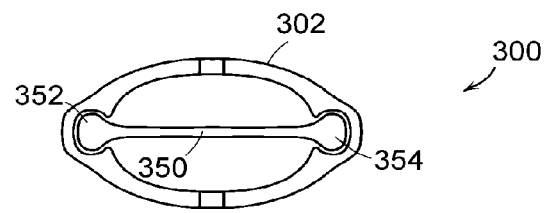
FIG. 15 shows a front view of an exemplary impact-attenuation member in accordance with the invention.
Figure 16:
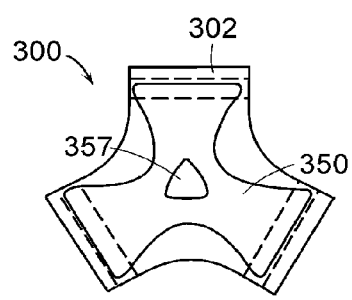
FIG. 16 shows a front view of another exemplary impact-attenuation member in accordance with the invention.
Figure 16:
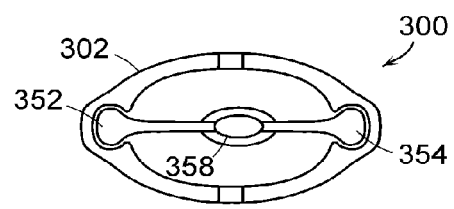
Figure 17:
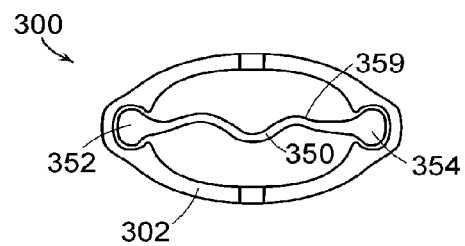
FIG. 17 shows a front view of a further exemplary impact-attenuation member in accordance with the invention.

Further, as shown in FIG. 15, tension element 350 may be planar with enlarged portions 352-354 for engaging spring element 302. As shown in FIGS. 16 and 17, tension element 350 may be substantially planar. Thus, for example, tension element 350 of FIG. 16 contains an air bladder 358; while tension element 350 of FIG. 17 has undulations. Even further, FIGS. 15-17 illustrate that different tension elements, having different stiffnesses, may be located within and engaged to similar spring elements. In other words, the stiffness characteristics or elastic properties of an impact-attenuation member 300 can be tailored for a specific need by supplying different tension elements.

Figure 18C:
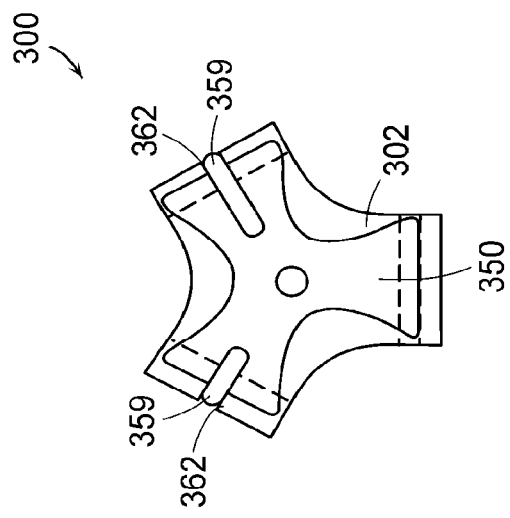
FIGS. 18A through 18C show a top view of even another exemplary tension element, another exemplary spring element and another exemplary impact-attenuation member including the tension element in accordance with the invention.
Figure 18B:
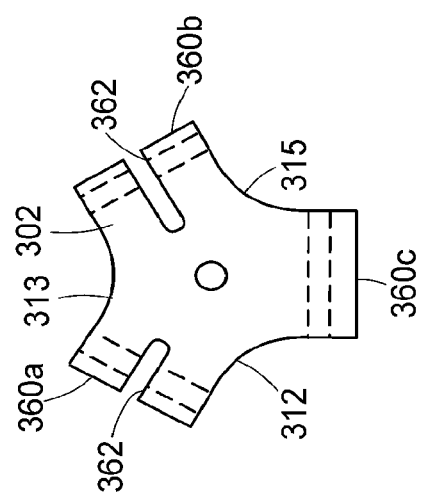
Figure 18A:
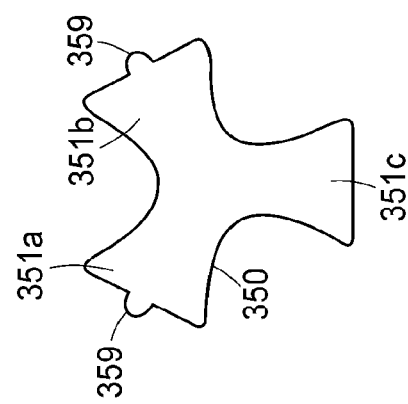

In a further alternative embodiment shown in FIGS. 18A-18C, a tension element 350 has projections 359 at the distal ends of arms 351a and 351b. As shown in FIG. 18B, spring element 302 is provided with cut-outs 362 in lobes 360a and 360b. Cut-outs 362 are shown as notches extending from the distal ends of lobes 360 such that the lobes are split into two sections along at least a portion of their length. Cut-outs 362 are configured to receive projections 359, i.e. projections 359 of tension member 350 engage with cut-outs 362 of spring element 302. Projections 359 provide further attachment of tension member 350 to spring element 302, such that the tension member may not be so easily slidably removed. Thus, during repeated loading and unloading of the impact-attenuation member, tension member 350 would be less likely to be worked out of engagement with spring element 302. Projections 359 may be provided on one, some, or all of the arms of tension element 350. By way of non-limiting examples, cut-outs 362 need not be notches that extend toward the center of the spring element, but could be relatively small openings or even just indentations on the interior, i.e. cavity, surface of the lobes. In one aspect, projections on tension element 350 may extend through the openings of spring element 302 which define the lobes 360. According to this aspect, as best shown in FIG. 18C, the projections would interact with surfaces 312, 313 and/or 315 to assist in retaining the tension element to the spring element. Even further, projections may be provided on spring element 302, with corresponding cut-outs, notches, indentations, etc. provided on tension element.

The embodiment of the impact-attenuation member shown in FIGS. 9 and 10 includes a tri-lobed tension element 350 having non-circular (in this particular embodiment, flat or straight) distal end surfaces of arms 351a-351c. If the tension element has non-circular enlarged portions as in FIGS. 9 and 10, then pure rotational sliding engagement of the tension element with the receptacles of the spring element is not possible. Rather, referring to FIGS. 19A-E, engagement could be accomplished by flexing one or both of tension element 350 and spring element 302 and working the distal ends of arms 351a-351c into receptacles 306 via a combination of sliding and elastic-deformation snapping action. As an example, in a first step, tension element 350 is deformed and inserted into the cavity 304 of spring element 302. The enlarged distal ends 352-354 of the arms of tension element 350 are unable to be received within receptacles 306 due to the narrowed geometry at the lips of receptacles 306. In FIGS. 19A-B, this first step, step (a), is illustrated with both a top view (FIG. 19A) and a front view (FIG. 19B) of a compressed tension element 350 inserted into the cavity of a non-deformed spring element 302. In a second step, the spring element 302 is compressed or deformed across its width such that any lips at the entrance to the receptacles are parted or widened, allowing the enlarged portions of tension element 350 to enter the receptacles. In FIG. 19C, this second step, step (b), is illustrated with a front view of a compressed or deformed spring element 302 and a compressed tension element. In a third step, the enlarged portions of tension element lie fully within the receptacles, allowing both the tension element and the spring element to return to their undeformed shapes. This step is illustrated in FIGS. 19D-E with a top view (FIG. 19D) and a front view (FIG. 19E) of tension element 350 engaged with spring element 302.

Figures 20A, 20B, 20C:
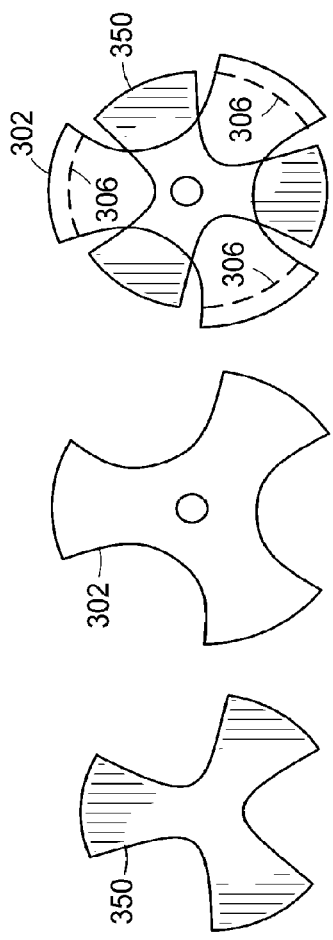
FIGS. 20A through 20 E illustrate another method for engaging a tension element with a spring element in accordance with the invention.
Figure 20E:
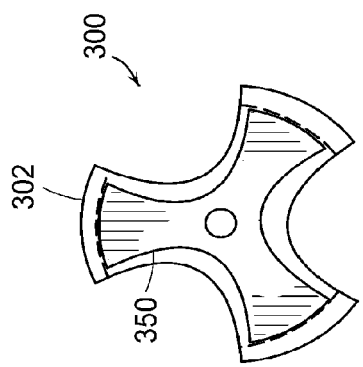
Figure 20D:
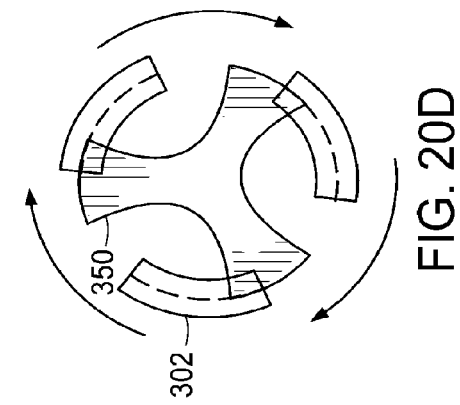

In an alternative embodiment show in FIGS. 20A-20E, the enlarged portions 352-354 of the distal ends of arms 351a-351c of tension element 350 could extend along a circular arc. In addition, spring element 302 could include complementarily curved cavity walls 336-338 and receptacles 306. When both the enlarged portions 352-354 of tension element 350 and the receptacles 306 of spring element 302 extend along complementary circular arcs, tension element 350 can be engaged (or disengaged) with spring element 302 by rotating tension element 350 with respect to spring member 302. This relative rotation allows the enlarged portion of the tension element to slide within the receptacles of the spring element. As an example, a tension element 350 (FIG. 20A) can be inserted into a spring element 302 (FIG. 20B) as shown in FIG. 20C. In FIG. 20C, the distal ends of the arms of tension element 350 do not yet engage the receptacles of spring element 302. In FIG. 20D, tension element 350 is rotated relative to spring element 302, and in the process of rotation, the distal ends of the arms of tension element 350 slidingly engage the receptacles of spring element 302 (schematically represented as portions of circular arcs, for clarity). In FIG. 20E, tension element 350 has been rotated to fully engage spring element 302.

Figure 21A:
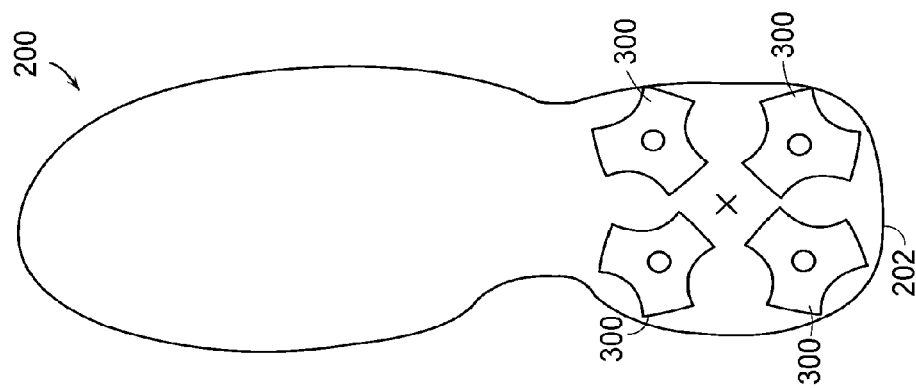
FIGS. 21A through 21C illustrate exemplary placements of impact-attenuation members on the heel area of an article of footwear in accordance with this invention.

FIG. 21A illustrates four impact-attenuation members 300 positioned in the heel area 202 of foot-receiving device 200. In this particular embodiment, it was desired to make the medial portion of the heel area firmer than the lateral portion of the heel area. Thus, impact-attenuation member 300a in the lateral heel strike zone (shown in gray) was configured to be less stiff than the other three impact-attenuation members. By way of non-limiting examples, impact-attenuation member 300a could be made less stiff by eliminating or not using any tension element that may be used by the other three impact-attenuation members, by using a tension element that is more compliant than the tension elements used by the other three impact-attenuation members or by using a spring element that is more compliant. Further, impact-attenuation member 300a could be made less stiff by changing its materials, its dimensions, or its geometric profile.

Figure 21B:
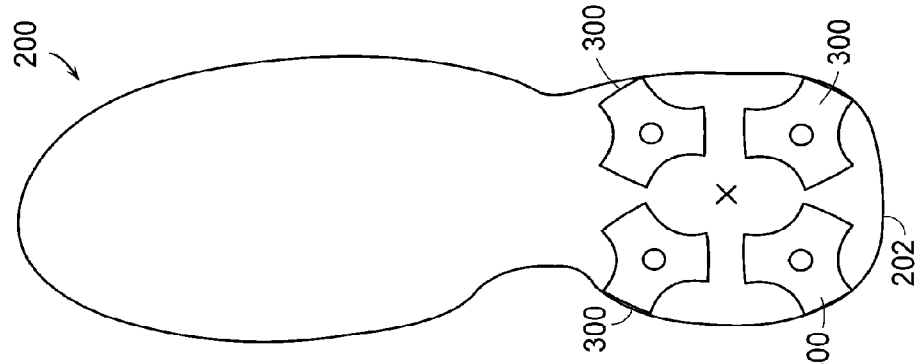
Figure 21C:
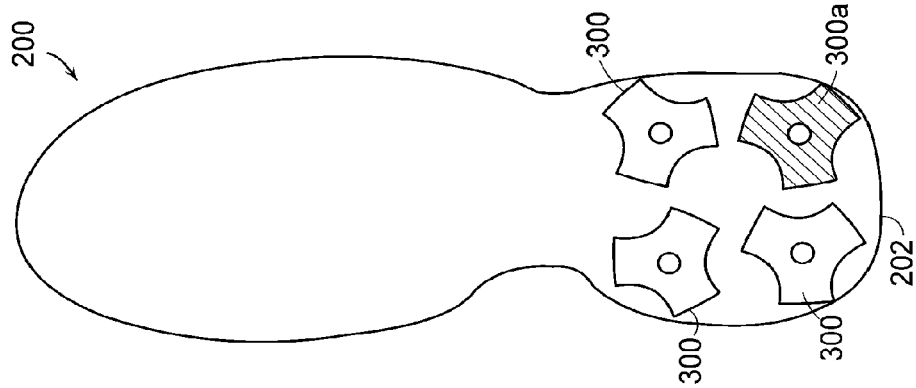

FIGS. 21B and 21C also illustrates four identical or substantially identical impact-attenuation members 300 positioned in the heel area 202 of foot-receiving device 200. In the embodiment of FIG. 21B, the four impact-attenuation members are arranged so as to provide a relatively soft or compliant impact-attenuation beneath the calcaneous area (marked with an 'X'). In particular, the stiffness characteristics of the portions of the impact-attenuation members nearest the calcaneous area is designed to be less than the stiffness characteristics of the portions of the impact-attenuation members more removed from the calcaneous area. In the embodiment of FIG. 21C, the four impact-attenuation members are arranged so as to provide a relatively stiff or less compliant impact-attenuation beneath the calcaneous area (marked with an 'X'). Thus, it can be seen that individual impact-attenuation members may be configured so as to provide distinct impact-attenuation properties in given zones of the foot. Furthermore, the impact-attenuation members can be arranged relative to one another to form a system.

Figure 22A:
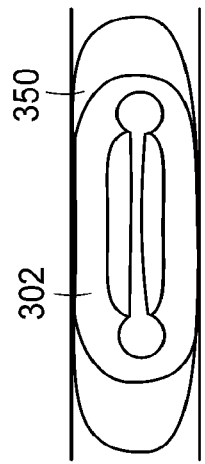
FIG. 22 shows various stages (a), (b) and (c) of compression of the exemplary impact-attenuation member of FIG. 9 in accordance with this invention.
Figure 22B:
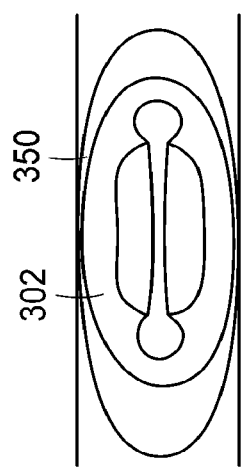
Figure 22C:
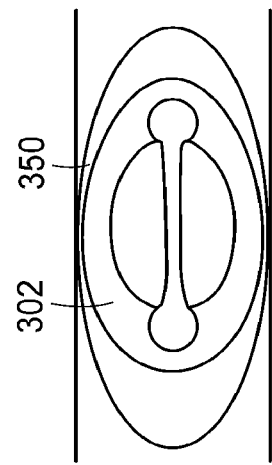

As best illustrated in FIGS. 22a through 22c, when a force or load is applied to top surface 320 and reacted by bottom surface 322, spring element 302 is compressed in the height direction. FIG. 22a shows impact-attenuation member 300 when load is first applied; FIG. 22b shows impact-attenuation member 300 when the applied load has compressed member 300 to approximately ¾ of its undeformed height; FIG. 22c shows impact-attenuation member 300 when the applied load has compressed member 300 to approximately ⅔ of its undeformed height. During the compression of member 300, receptacles 306 close down and increase their grip on enlarged portions 352, 353, 354 of tension element 350. At the same time, as the height dimension of impact-attenuation member 300 decreases, the width dimension (w) of spring element 302 is increased and the width dimension of tension element 350 is increased. Upon removal of the force, spring element 302 and tension element 350 return to their non-deformed configurations and energy that was stored in spring element 302 and in tension element 350 due to their elastic deformations is released.

As disclosed above, pairing any given configuration of spring element 302 with differing configurations and/or materials of tension element 350 would result in different stiffness characteristics for the impact-attenuation members. Thus, the stiffness characteristic of the impact-attenuation member can be tailored by providing specific stiffness characteristics of the individual spring elements 302 and/or tension elements 350 that make up the impact-attenuation member. As the spring elements 302 and the tension elements 350 can be manufactured separately, with the tension elements subsequently being engaged with the spring elements to form impact-attenuation members, many different impact-attenuation members may be readily formed (from the multitude of different spring/tension element combinations) while at the same time providing low inventory risk.

Of interest is that a rotationally symmetric impact-attenuation member, such as that illustrated in FIG. 9, would be expected to deflect evenly under the application of a centrally applied load, even though a stiffness characteristic at a front surface differs from a stiffness characteristic at a back surface. Thus, a centrally applied load could result in the impact-attenuation member compressing evenly in the height direction around the circumference. On the other hand, the rotationally symmetric impact-attenuation member of FIG. 9 would not be expected to compress evenly under a non-centrally applied load. Thus, for example, under the application of a distributed line-load extending from front surface 110 to back surface 112, one would expect the impact-attenuation member to compress unevenly due to the difference in stiffness characteristics at the front surface and the back surface.

Figure 23:
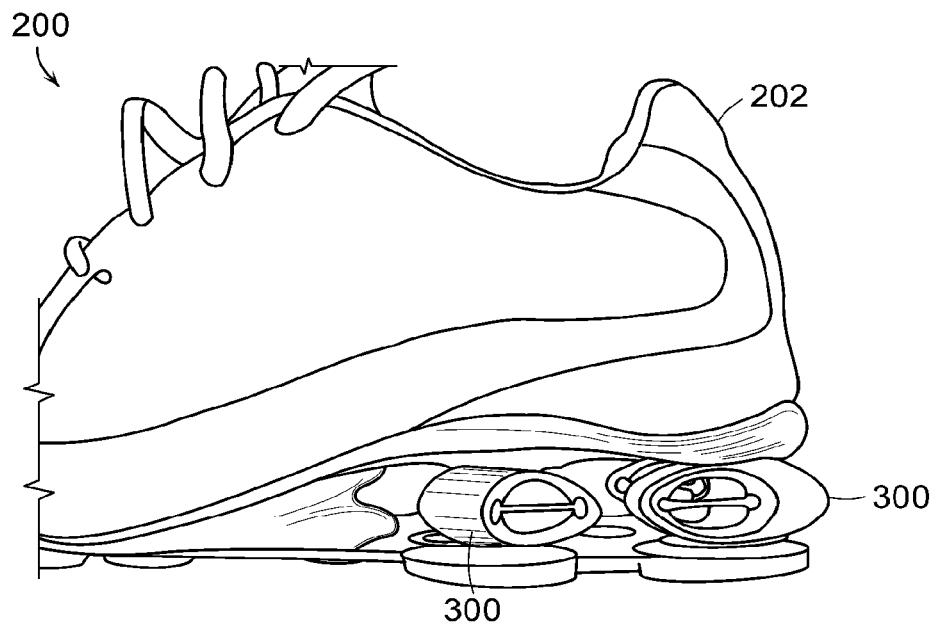
Figure 24:
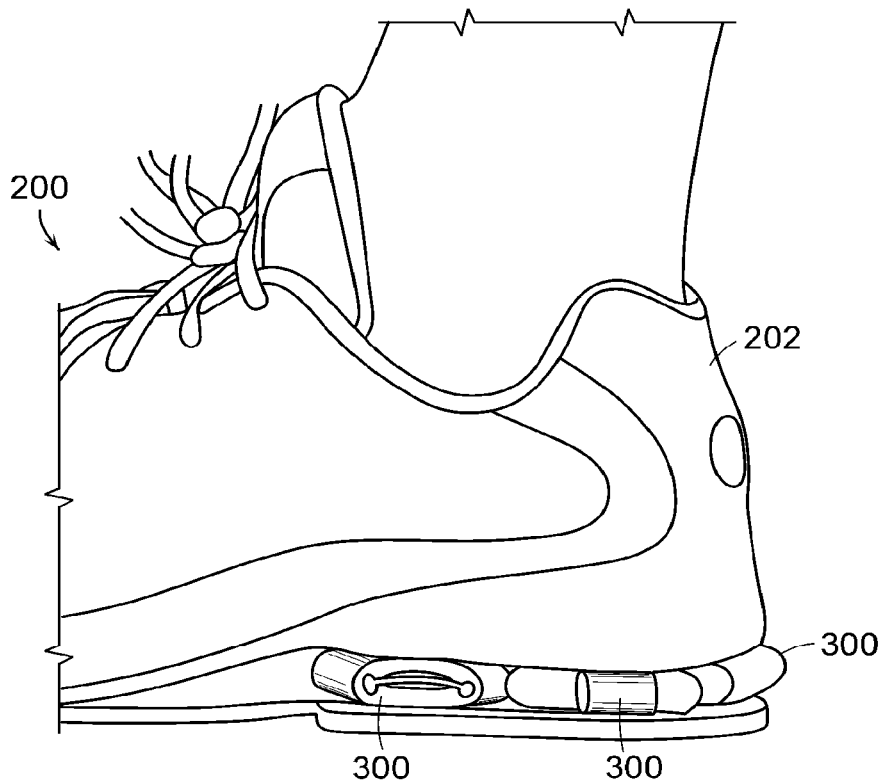

In an exemplary embodiment, FIGS. 23 and 24 show four impact attenuation members 300 located under the heel portion 202 of a foot-receiving device 200. FIG. 23 illustrates the foot-receiving device 200 with no external load applied. The impact-attenuation members are not deflected. FIG. 24 illustrates the foot-receiving device 200 with an external load applied. The impact-attenuation members are shown compressed.

D. Conclusion

While the invention has been described with respect to specific examples including presently preferred modes of carrying out the invention, those skilled in the art will appreciate that there are numerous variations and permutations of the above described systems and methods. Thus, the spirit and scope of the invention should be construed broadly as set forth in the appended claims.

What is claimed is:

1. An impact-attenuation member comprising:
a spring element characterized by dimensions in mutually perpendicular height, length and width directions, the height dimension extending from a top surface to a bottom surface, and at least one of the top surface and the bottom surface adapted for mounting,
a tension element engaging the spring element and extending in the width direction of the spring element;
wherein the spring element defines a cavity;
wherein the tension element is located at least partially within the cavity;
wherein at most one of two mutually perpendicular planes, each extending in the height direction, defines a plane of symmetry of the spring element, and
wherein the spring element is a truncated, hollow, substantially conical shape.

2. The member of claim 1, wherein the tension element is substantially planar, and wherein the tension element engages one or more receptacles in the spring element.

3. The member of claim 1, wherein the length dimension of the spring element extends from a front end to a back end and wherein at least one of the front end and the back end is at least partially curved.

4. A foot-receiving device comprising:
at least one of a foot-covering member, a foot-supporting member and a surface-contacting member; and
at least one impact-attenuation member having a mounting surface mounted to the at least one of the foot-covering member, the foot-supporting member and the surface-contacting member, the impact-attenuation member comprising:
at least one spring element characterized by dimensions in mutually perpendicular height, length and width directions, the height dimension extending from a top surface to a bottom surface, and at least one of the top surface and the bottom surface comprising the mounting surface; and
a tension element engaging the spring element and extending in the width direction of the spring element;
wherein at most one of two mutually perpendicular planes, each extending in the height direction, defines a plane of symmetry of the spring element, and
wherein the spring element is a truncated, hollow, substantially conical shape.

* * * * *